(12) United States Patent
Junge et al.

(10) Patent No.: US 9,701,905 B2
(45) Date of Patent: Jul. 11, 2017

(54) LIQUID-CRYSTALLINE MEDIUM

(71) Applicant: Merck Patent GmbH, Darmstadt (DE)

(72) Inventors: Michael Junge, Pfungstadt (DE);
Andreas Beyer, Hanau (DE); Ursula Patwal, Reinheim-Georgenhausen (DE);
Peer Kirsch, Seeheim-Jungenheim (DE); Susann Beck, Darmstadt (DE);
Casper Laurens Van Oosten, Eindhoven (NL); Felix Fritz Rudolf Schlosser, Wuerzburg (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 14/651,837

(22) PCT Filed: Nov. 22, 2013

(86) PCT No.: PCT/EP2013/003536
§ 371 (c)(1),
(2) Date: Jun. 12, 2015

(87) PCT Pub. No.: WO2014/090373
PCT Pub. Date: Jun. 19, 2014

(65) Prior Publication Data
US 2015/0299577 A1    Oct. 22, 2015

Related U.S. Application Data

(60) Provisional application No. 61/739,293, filed on Dec. 19, 2012.

(30) Foreign Application Priority Data

Dec. 13, 2012 (EP) .................... 12008320

(51) Int. Cl.
*G02F 1/1333* (2006.01)
*C09K 19/60* (2006.01)
*C09K 11/06* (2006.01)
*C09K 19/30* (2006.01)

(52) U.S. Cl.
CPC ............ *C09K 19/606* (2013.01); *C09K 11/06* (2013.01); *C09K 19/3068* (2013.01); *C09K 19/60* (2013.01); *C09K 2019/3078* (2013.01); *C09K 2019/3083* (2013.01); *C09K 2211/1011* (2013.01); *C09K 2211/1029* (2013.01); *C09K 2211/1033* (2013.01); *C09K 2211/1044* (2013.01); *C09K 2211/1048* (2013.01); *C09K 2219/13* (2013.01)

(58) Field of Classification Search
CPC .. C09K 19/606; C09K 19/60; C09K 19/3068; C09K 11/06; C09K 2019/3078; C09K 2019/3083; C09K 2019/13; C09K 2211/1011; C09K 2211/1029; C09K 2211/1033; C09K 2211/1044; C09K 2211/1048; G02F 1/1333
USPC ............ 252/299.01, 299.6, 299.61; 428/1.1
See application file for complete search history.

(56) References Cited

U.S. PATENT DOCUMENTS

| | | | |
|---|---|---|---|
| 4,378,302 A | 3/1983 | Aftergut et al. | |
| 4,454,057 A | 6/1984 | Kaneko et al. | |
| 4,459,218 A | 7/1984 | Yamada et al. | |
| 4,555,355 A | 11/1985 | Yamada et al. | |
| 4,935,160 A * | 6/1990 | Scheuble ............. | C09K 19/606 252/299.1 |

FOREIGN PATENT DOCUMENTS

| | | |
|---|---|---|
| EP | 0047027 A1 | 3/1982 |
| EP | 0060895 A1 | 9/1982 |
| EP | 0068427 A1 | 1/1983 |

OTHER PUBLICATIONS

International Search Report dated Jan. 30, 2014 issued in corresponding PCT/EP2013/003536 application (pp. 1-4).

* cited by examiner

*Primary Examiner* — Geraldina Visconti
(74) *Attorney, Agent, or Firm* — Millen White Zelano and Branigan, PC; Csaba Henter; Anthony Zelano

(57) ABSTRACT

The application relates to a liquid-crystalline medium comprising at least one dichroic dye having a rylene structure which absorbs red light. The application furthermore relates to a device, preferably a device for the regulation of the passage of energy through a light-transmitting area, which contains the liquid-crystalline medium.

21 Claims, No Drawings

LIQUID-CRYSTALLINE MEDIUM

The present application relates to a liquid-crystalline medium comprising at least one dichroic dye having a rylene structure which absorbs red or longer-wave light. The liquid-crystalline medium according to the application can be employed in LC devices of the guest-host type, preferably in devices for the regulation of the passage of energy through light-transmitting areas.

For the purposes of the present application, a dichroic dye is taken to mean a light-absorbent compound in which the absorption properties are dependent on the alignment of the compound to the polarisation direction of the light.

A dye having a rylene structure is taken to mean any desired dye which contains one or more units of the structural element

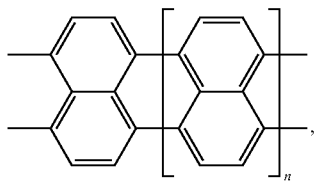

where n is an integer and is at least one, and where the structural element may be substituted by any desired radicals at the bonds shown and at the free positions.

For the purposes of the present application, the term liquid-crystalline medium is taken to mean a material which has liquid-crystalline properties under certain conditions. The material preferably has liquid-crystalline properties at room temperature and in a certain temperature range above and below room temperature.

An LC device in general is taken to mean a device which has at least one layer comprising a liquid-crystalline medium. The layer is preferably a switchable layer, particularly preferably an electrically switchable layer.

For the purposes of the present application, an LC device of the guest-host type is taken to mean a switchable device which comprises a switchable layer comprising a liquid-crystalline medium, where the liquid-crystalline medium comprises one or more dichroic dyes. The dichroic dye is preferably dissolved in the liquid-crystalline medium and is furthermore preferably influenced in its alignment by the alignment of the compounds of the liquid-crystalline medium. The device is preferably electrically switchable. The device furthermore preferably generates a change from a state of low light transmission to a state of high light transmission through the device by means of application or switching-off of electric voltage. Devices of the guest-host type were developed for the first time by Heilmeier and Zanoni (G. H. Heilmeier et al., Appl. Phys. Lett., 1968, 13, 91) and have been used many times since then, in particular in display devices.

For LC devices of the guest-host type, in addition to the use in display devices, the use in switching devices for the regulation of the passage of energy is also known, for example from WO 2009/141295 and WO 2010/118422.

Liquid-crystalline media comprising a rylene dye which absorbs blue light are known from the area of display devices of the guest-host type (EP 0060895 and EP 0047027). Furthermore, liquid-crystalline media comprising one or more dichroic dyes which absorb red light are known from the area of display devices of the guest-host type (DE 3307238). The dyes disclosed therein are anthraquinones, naphthoquinones and azo dyes. Rylenes have not been disclosed as dichroic dyes. The dichroic dyes disclosed in DE 3307238 have improvement potential with respect to the intensity of the fluorescence and the solubility in liquid-crystalline media. Furthermore, the liquid-crystalline media comprising the said dichroic dyes have improvement potential with respect to the stability to light, extreme temperatures and electric fields.

From the area of switching devices for the regulation of the passage of energy, WO 2009/141295 and WO 2010/118422 describe in general the use of liquid-crystalline media of the guest-host type in such switching devices. These applications either remain general concerning the dichroic dye or disclose absolutely no dichroic dyes which absorb red light.

Devices which comprise no dichroic dye which absorbs red light or NIR light cannot control the majority of the radiation energy, namely that in the region of red VIS and NIR light, which represents a disadvantage.

The technical object of the present invention is therefore to provide a liquid-crystalline medium which is able to control, i.e. either block or transmit, radiation energy in the region of red VIS and NIR light in devices of the guest-host type. This property can preferably be utilised efficiently in switching devices for the regulation of the passage of energy.

It is therefore a further technical object for the liquid-crystalline medium to be stable to sunlight, in particular UV light, and to electric fields for a long time. It is furthermore a technical object for the dichroic dye to be readily soluble in the liquid-crystalline medium and for the solubility to be retained over a long time.

Dyes of the rylene type which absorb red light are known as such in the prior art. For example, their use as dyes in electrophotographic devices is disclosed in DE 3110960.

Surprisingly, it has now been found that a liquid-crystalline medium comprising at least one dichroic dye having a rylene structure which absorbs red or longer-wave light achieves the technical objects mentioned above.

In particular, it has been found that the dye is highly soluble in the liquid-crystalline medium and remains dissolved therein in a stable manner over a long time, even at low or high temperatures. It has furthermore been found that the liquid-crystalline medium is stable to UV light, heat and electric fields.

The present application thus relates to a liquid-crystalline medium comprising at least one dichroic dye F having a rylene structure whose longest-wave absorption maximum is at a wavelength of greater than 600 nm.

An absorption maximum here is taken to mean the maximum of an absorption band which makes up at least 10%, preferably at least 20%, particularly preferably at least 30% and very particularly preferably at least 40% of the integral over the entire absorption in the UV-VIS-NIR region of light.

UV-VIS-NIR light here is taken to mean light having a wavelength of 320 to 2000 nm, preferably light having a wavelength of 320 to 1500 nm.

The dichroic dye F is preferably dissolved in the liquid-crystalline medium. It is preferably influenced in its alignment by the alignment of the compounds of the liquid-crystalline medium.

The dichroic dye F is preferably a positively dichroic dye, i.e. a dye which has a positive degree of anisotropy R, determined as indicated in the working examples. The degree of anisotropy R is particularly preferably greater than 0.4, very particularly preferably greater than 0.5 and most preferably greater than 0.6, where R is determined as indicated in the working examples.

The absorption preferably reaches a maximum when the polarisation direction of the light is parallel to the direction of the longest elongation of the molecule and reaches a minimum when the polarisation direction of the light is perpendicular to the direction of the longest elongation of the molecule.

The dichroic dye F in accordance with the present application furthermore preferably absorbs predominantly light in the deep-red to NIR region of the spectrum, i.e. in a wavelength range from 580 to 2000 nm, preferably 590 to 1500 nm, particularly preferably 600 to 1300 nm. The absorption maximum of the dye is furthermore preferably between 605 and 2000 nm, particularly preferably 610 to 1300 nm, very particularly preferably 620 to 1200 nm.

For the purposes of the present application, the formulation that a dye absorbs predominantly in a certain region of the light spectrum is taken to mean that the dye has 70% or more of the integral over its total absorption in the UV-VIS-NIR region in this region, in particular 80% or more, again in particular 90% or more.

The dichroic dye F is preferably present in the liquid-crystalline medium according to the invention in a concentration of 0.1% by weight to 10% by weight, particularly preferably 0.15% by weight to 7% by weight and very particularly preferably 0.2% by weight to 7% by weight.

The dichroic dye F is furthermore preferably a fluorescent dye.

Fluorescence here is taken to mean that a compound is placed in an electronically excited state by absorption of light having a certain wavelength, where the compound is subsequently converted into the ground state with emission of light. The emitted light preferably has a longer wavelength than the absorbed light. The transition from the excited state to the ground state is furthermore preferably spin-allowed, i.e. takes place without a change in the spin. The lifetime of the excited state of the fluorescent compound is furthermore preferably shorter than $10^{-5}$ s, particularly preferably shorter than $10^{-6}$ s, very particularly preferably between $10^{-9}$ and $10^{-7}$ s.

It is preferred in accordance with the invention for the dichroic dye F to contain only a single rylene chromophore. It particularly preferably contains only a single chromophore, i.e. is a monochromophore dye.

In accordance with the invention, the dichroic dye F contains at least one group of the following formula:

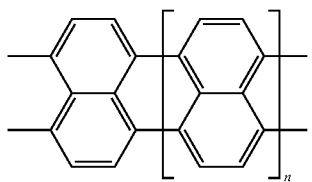

which is optionally substituted and where n is at least 1, where n preferably has the value 1, 2, 3, 4, 5, 6, 7 or 8, and particularly preferably has the value 1, 2, 3, 4 or 5.

The dichroic dye F is preferably selected from compounds of the formulae (F-I) to (F-V), as defined below.

The following conditions apply to formula (F-I):

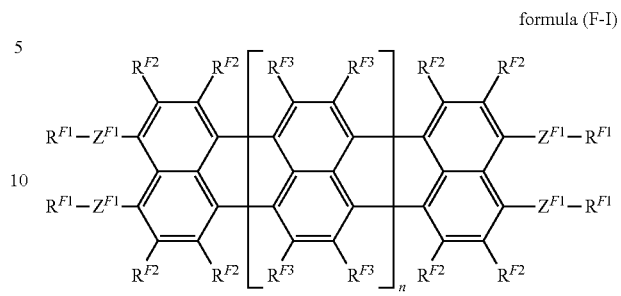

formula (F-I)

n is selected from 1, 2, 3, 4, 5, 6, 7 and 8;

$Z^{F1}$ is selected on each occurrence, identically or differently, from a single bond, —C(=O)O—, —OC(=O)—, —C(=O)S—, —SC(=O)—, —CF$_2$—, —CF$_2$—CF$_2$—, —CF$_2$O—, —OCF$_2$— and —O—;

$R^{F1}$ is selected on each occurrence, identically or differently, from an alkyl or alkoxy group having 1 to 10 C atoms, or an alkenyl or alkynyl group having 2 to 10 C atoms, or a cycloalkyl group having 3 to 10 C atoms, where the said groups may be substituted by one or more radicals $R^{F4}$, or an aryl or heteroaryl group having 6 to 30 aromatic ring atoms, which may be substituted by one or more radicals $R^{F4}$;

$R^{F2}$, $R^{F3}$ are selected on each occurrence, identically or differently, from H, F, Cl, Br, OR$^{F4}$, OCH$_2$R$^{F4}$, SR$^{F4}$, SCH$_2$R$^{F4}$, C(=O)OR$^{F4}$, an alkyl or alkoxy group having 1 to 10 C atoms, or an alkenyl or alkynyl group having 2 to 10 C atoms, or a cycloalkyl group having 3 to 10 C atoms, where the said groups may be substituted by one or more radicals $R^{F4}$, or an aryl or heteroaryl group having 6 to 30 aromatic ring atoms, which may be substituted by one or more radicals $R^{F4}$, or an aralkyl or heteroaralkyl group having 6 to 30 aromatic ring atoms, which may be substituted by one or more radicals $R^{F4}$, or an aryloxy or heteroaryloxy group having 6 to 30 aromatic ring atoms, which may be substituted by one or more radicals $R^{F4}$;

$R^{F4}$ is selected on each occurrence, identically or differently, from F, Cl, Br, —OCF$_2$R$^{FB}$, —CF$_2$O—R$^{FB}$, an alkyl or alkoxy group having 1 to 10 C atoms, or an alkenyl or alkynyl group having 2 to 10 C atoms, or a cycloalkyl group having 3 to 10 C atoms, where the said groups may be substituted by one or more radicals $R^{FB}$, or an aryl or heteroaryl group having 6 to 30 aromatic ring atoms, which may be substituted by one or more radicals $R^{FB}$;

$R^{FB}$ is selected on each occurrence, identically or differently, from F or an aliphatic, aromatic or heteroaromatic organic radical having 1 to 20 C atoms.

For compounds of the formula (F-I), it is preferred for n to be selected from 2, 3, 4, 5 or 6. n is particularly preferably selected from 2, 3, 4 or 5.

$Z^{F1}$ is furthermore preferably selected on each occurrence, identically or differently, from a single bond, —C(=O)O—, —OC(=O)—, —CF$_2$—, —CF$_2$—CF$_2$—, —CF$_2$O—, —OCF$_2$— and —O—, and particularly preferably selected from —C(=O)O— and —OC(=O)—.

It is preferred for $R^{F1}$ to be selected on each occurrence, identically or differently, from an alkyl or alkoxy group having 1 to 10 C atoms, or a cyclohexyl group, where the said groups may be substituted by one or more radicals $R^{F4}$, or an aryl or heteroaryl group having 6 aromatic ring atoms, which may be substituted by one or more radicals $R^{F4}$.

$R^{F1}$ is particularly preferably selected on each occurrence, identically or differently, from an alkyl or alkoxy group having 1 to 10 C atoms, which may be substituted by one or more radicals $R^{F4}$, or from one of the following formulae ($R^{F1}$-1) to ($R^{F1}$-6):

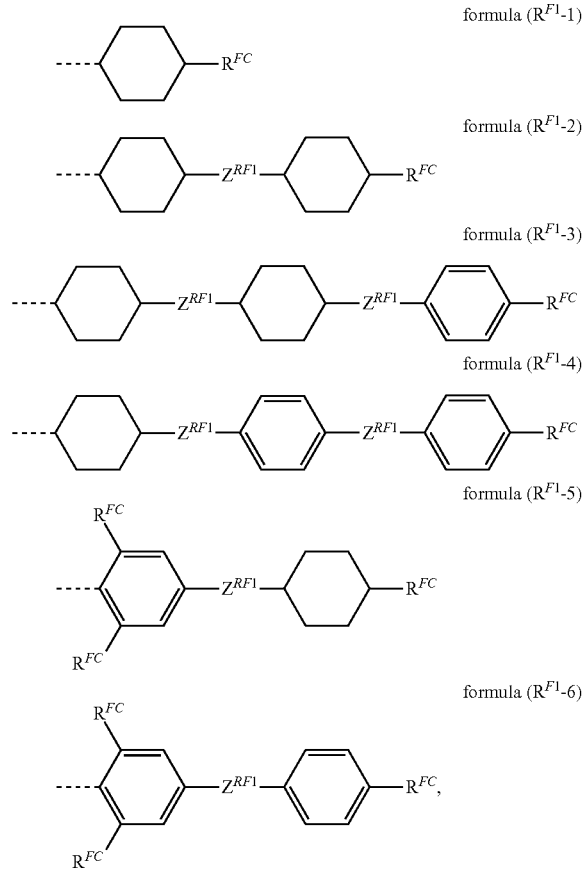

where the groups of the formulae ($R^{F1}$-1) to ($R^{F1}$-6) may be substituted at all free positions by one or more radicals $R^{F4}$, and where the dashed line denotes the bond to the remainder of the formula, and where $R^{FC}$ is selected on each occurrence, identically or differently, from H, F, an alkyl group having 1 to 10 C atoms or an alkoxy group having 1 to 10 C atoms, where one or more H atoms in the above-mentioned groups may be replaced by F; and $Z^{RF1}$ is selected on each occurrence, identically or differently, from a single bond, —OCF$_2$— and —CF$_2$O—.

$R^{F2}$ and $R^{F3}$ are particularly preferably selected on each occurrence, identically or differently, from H, F, Cl, C(=O)OR$^{F4}$, OCF$_3$, SCF$_3$ or an alkyl or alkoxy group having 1 to 10 C atoms, which may be substituted by one or more radicals $R^{F4}$, or an aralkyl group having 6 to 30 aromatic C atoms, which may be substituted by one or more radicals $R^{F4}$, or an aryloxy group having 6 to 30 aromatic ring atoms, which may be substituted by one or more radicals $R^{F4}$.

If $Z^{F1}$ is a —C(=O)O— or —OC(=O)— group, $R^{F1}$ is preferably selected so that the group bonded directly to $Z^{F1}$ is not an unsubstituted phenyl group.

The following conditions apply to formula (F-II):

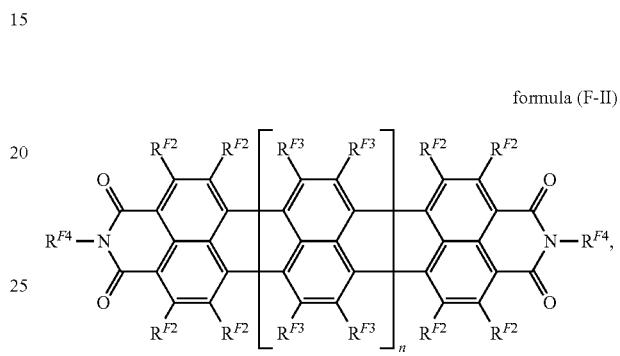

where n is equal to 1, 2, 3, 4, 5, 6, 7 or 8;
$R^{F4}$ is defined like $R^{F2}$ above;
and the other radicals are defined as above.

For compounds of the formula (F-II), it is preferred for n to be selected from 1, 2, 3, 4, 5 or 6. n is particularly preferably selected from 2, 3, 4 or 5.

For $R^{F1}$ and $R^{F2}$ and $R^{F3}$, the preferred embodiments indicated above for formula (F-I) are likewise preferred.

The following conditions apply to formula (F-III):

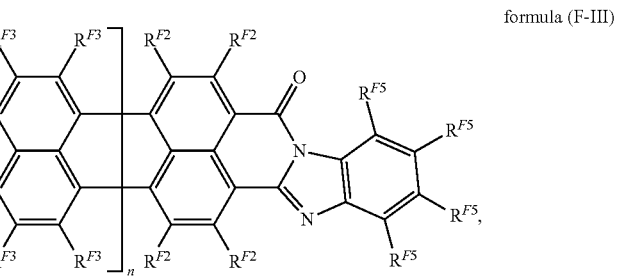

where n is equal to 0, 1, 2, 3, 4, 5, 6, 7 or 8;
$R^{F5}$ is defined like $R^{F2}$ above;
and the other radicals are defined as above.

For compounds of the formula (F-III), it is preferred for n to be selected from 0, 1, 2, 3, 4, 5 or 6. n is particularly preferably selected from 1, 2, 3, 4 or 5.

For $R^{F1}$ and $R^{F2}$ and $R^{F3}$, the preferred embodiments indicated above for formula (F-I) are likewise preferred.

It is furthermore preferred for $R^{F3}$ in formula (F-III) not to represent an aryloxy group if n is equal to zero.

The following conditions apply to formula (F-IV):

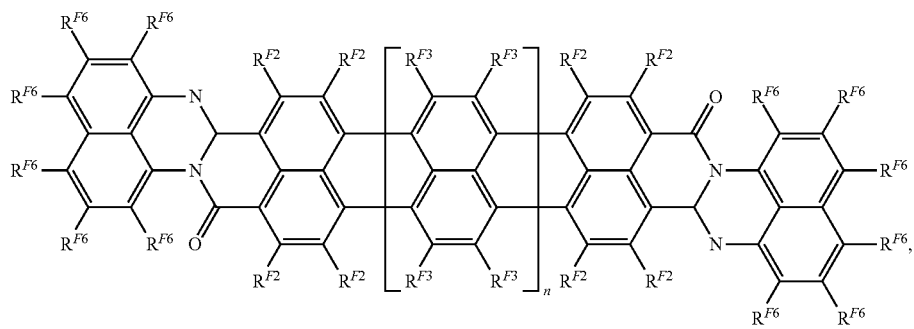

formula (F-IV)

where n is equal to 0, 1, 2, 3, 4, 5, 6, 7 or 8;
$R^{F6}$ is defined like $R^{F2}$ above;
and the other radicals are defined as above.

For compounds of the formula (F-IV), it is preferred for n to be selected from 0, 1, 2, 3, 4, 5 or 6. n is particularly preferably selected from 1, 2, 3, 4 or 5.

For $R^{F1}$ and $R^{F2}$ and $R^{F3}$, the preferred embodiments indicated above for formula (F-I) are likewise preferred.

The following conditions apply to formula (F-V):

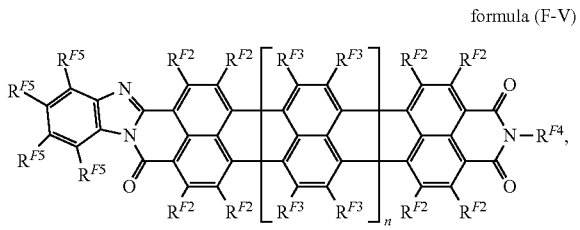

formula (F-V)

where n is equal to 0, 1, 2, 3, 4, 5, 6, 7 or 8;
and the other radicals are defined as above.

For compounds of the formula (F-V), it is preferred for n to be selected from 0, 1, 2, 3, 4, 5 or 6. n is particularly preferably selected from 1, 2, 3, 4 or 5.

For $R^{F1}$ and $R^{F2}$ and $R^{F3}$, the preferred embodiments indicated above for formula (F-I) are likewise preferred.

It is furthermore preferred for $R^{F3}$ in formula (F-V) not to represent an aryloxy group if n is equal to zero.

The following definitions for chemical groups apply:

An aryl group in the sense of the present application contains 6 to 60 aromatic ring atoms; a heteroaryl group in the sense of this invention contains 5 to 60 aromatic ring atoms, at least one of which represents a heteroatom. The heteroatoms are preferably selected from N, O and S. This represents the basic definition. If other preferences are indicated in the description of the present invention, for example with respect to the number of aromatic ring atoms or the heteroatoms present, these apply.

An aryl group or heteroaryl group here is taken to mean either a simple aromatic ring, i.e. benzene, or a simple heteroaromatic ring, for example pyridine, pyrimidine or thiophene, or a condensed (annellated) aromatic or heteroaromatic polycycle, for example naphthalene, phenanthrene, quinoline or carbazole. A condensed (annellated) aromatic or heteroaromatic polycycle in the sense of the present application consists of two or more simple aromatic or heteroaromatic rings condensed to one another.

An aralkyl group in the sense of this invention is an alkyl group which is substituted by an aryl group, where the term aryl group is to be taken to mean as defined above and the alkyl group has 1 to 20 C atoms, where individual H atoms and/or $CH_2$ groups in the alkyl group may also be replaced by the groups mentioned in the definition of the alkyl groups and where the alkyl group represents the group which is bonded to the remainder of the compound. A corresponding situation applies to a heteroaralkyl group, where aryl is to be replaced by heteroaryl.

An aryloxy group in accordance with the definition of the present invention is taken to mean an aryl group as defined above which is bonded via an oxygen atom. An analogous definition applies to heteroaryloxy groups.

The invention furthermore relates to the use of a dichroic dye F having a rylene structure whose longest-wave absorption maximum is at a wavelength of greater than 600 nm, in an LC device of the guest-host type.

For the LC device of the guest-host type, the preferred embodiments indicated elsewhere are also preferred here.

For the dichroic dye F, the preferred embodiments indicated elsewhere are also preferred here.

It is preferred in accordance with the invention for the liquid-crystalline medium also to comprise further dichroic dyes besides the dichroic dye F. It particularly preferably comprises one, two, three or four further dyes, very particularly preferably two or three further dyes and most preferably three further dyes.

With respect to the property of dichroism, the preferred properties described for the dichroic dye F are also preferred for the further dichroic dyes optionally present.

The absorption spectra of the dichroic dyes in the liquid-crystalline medium preferably complement one another in such a way that the impression of a black colour arises for the eye. The two or more dichroic dyes of the liquid-crystalline medium according to the invention preferably cover a large part of the visible spectrum. This is preferably achieved through two or three further dichroic dyes being used in addition to the dichroic dye F, where at least one of the further dichroic dyes absorbs green to yellow light and at least one absorbs blue light.

The light colour here is determined in accordance with B. Bahadur, Liquid Crystals—Applications and Uses, Vol. 3, 1992, World Scientific Publishing, Section 11.2.1. It is pointed out that the perceived colour of the dye in each case represents the complementary colour to the absorbed colour, i.e. that a dye which absorbs blue light has a yellow colour.

The further dichroic dyes furthermore preferably absorb predominantly light in the UV-VIS-NIR region, i.e. in a wavelength range from 320 to 2000 nm. UV light here denotes light having a wavelength of 320 to 380 nm, VIS light denotes light having a wavelength of 380 to 780 nm, and NIR light denotes light having a wavelength of 780 to 2000 nm. They particularly preferably have absorption maxima in the range from 400 to 1300 nm.

If one or more of the dyes are only sparingly soluble, it may be advantageous to add a further dye having a similar absorption maximum, for example to add a further dye which absorbs blue light in the case of low solubility of the dye which absorbs blue light.

The precise way in which a mixture of dyes which appears black or grey to the eye can be prepared is known to the person skilled in the art and is described, for example, in Manfred Richter, Einführung in die Farbmetrik [Introduction to Colorimetry], 2nd Edition, 1981, ISBN 3-11-008209-8, Verlag Walter de Gruyter & Co.

The adjustment of the colour location of a mixture of dyes is described in the area of colorimetry. To this end, the spectra of the individual dyes are calculated taking into account the Lambert-Beer law to give an overall spectrum and converted into the corresponding colour locations and luminance values under the associated illumination, for example illuminant D65 for daylight, in accordance with the rules of colorimetry. The position of the white point is fixed by the respective illuminant, for example D65, and is quoted in tables (for example reference above). Different colour locations can be set by changing the proportions of the various dyes.

According to a preferred embodiment, the liquid-crystalline medium according to the invention comprises one or more dichroic dyes which absorb light in the red and NIR region, i.e. at a wavelength of 600 to 2000 nm, preferably in the range from 650 to 1800 nm, particularly preferably in the range from 650 to 1300 nm. These dichroic dyes are furthermore preferably compounds having a rylene structure.

The proportion of the dichroic dye or dichroic dyes in the liquid-crystalline medium according to the invention is preferably in total 0.01 to 10% by weight, particularly preferably 0.1 to 7% by weight and very particularly preferably 0.2 to 7% by weight. The proportion of an individual dichroic dye is preferably 0.01 to 10% by weight, preferably 0.05 to 7% by weight and very particularly preferably 0.1 to 7% by weight.

The further dichroic dyes are furthermore preferably selected from the dye classes indicated in B. Bahadur, Liquid Crystals—Applications and Uses, Vol. 3, 1992, World Scientific Publishing, Section 11.2.1, and particularly preferably from the explicit compounds given in the table present therein.

The further dichroic dyes are preferably selected from azo compounds, anthraquinones, methine compounds, azomethine compounds, merocyanine compounds, naphthoquinones, tetrazines, perylenes, terrylenes, quaterrylenes, higher rylenes and pyrromethenes. Of these, particular preference is given to perylenes, terrylenes, quaterrylenes, pentarylenes and hexarylenes.

The said dyes belong to the classes of dichroic dyes which are known to the person skilled in the art and have been described many times in the literature.

Thus, for example, anthraquinone dyes are described in EP 34832, EP 44893, EP 48583, EP 54217, EP 56492, EP 59036, GB 2065158, GB 2065695, GB 2081736, GB 2082196, GB 2094822, GB 2094825, JP-A 55-123673, DE 3017877, DE 3040102, DE 3115147, DE 3115762, DE 3150803 and DE 3201120, naphthoquinone dyes are described in DE 3126108 and DE 3202761, azo dyes are described in EP 43904, DE 3123519, WO 82/2054, GB 2079770, JP-A 56-57850, JP-OS 56-104984, U.S. Pat. No. 4,308,161, U.S. Pat. No. 4,308,162, U.S. Pat. No. 4,340,973, T. Uchida, C. Shishido, H. Seki and M. Wada: Mol. Cryst. Liq. Cryst. 39, 39-52 (1977), and H. Seki, C. Shishido, S. Yasui and T. Uchida: Jpn. J. Appl. Phys. 21, 191-192 (1982), and perylenes are described in EP 60895, EP 68427 and WO 82/1191.

Very particular preference is furthermore given to rylene dyes as disclosed, for example, in EP 2166040, US 2011/0042651, EP 68427, EP 47027, EP 60895, DE 3110960 and EP 698649.

According to a preferred embodiment, the liquid-crystalline medium according to the invention comprises exclusively dichroic dyes selected from the class of the rylene dyes.

Examples of preferred dichroic dyes which may be present in the liquid-crystalline medium according to the invention are depicted in the following table:

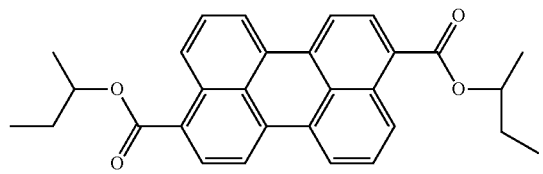 [SMILES: CCC(C)OC(=O)c1ccc2c3cccc4c(C(=O)OC(C)CC)ccc(c5cccc1c52)c43]

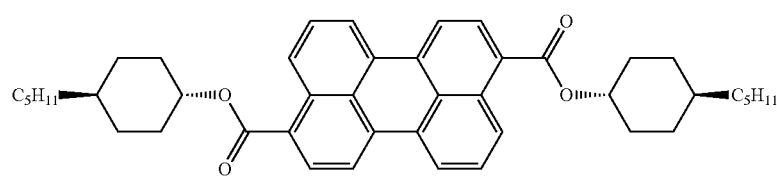

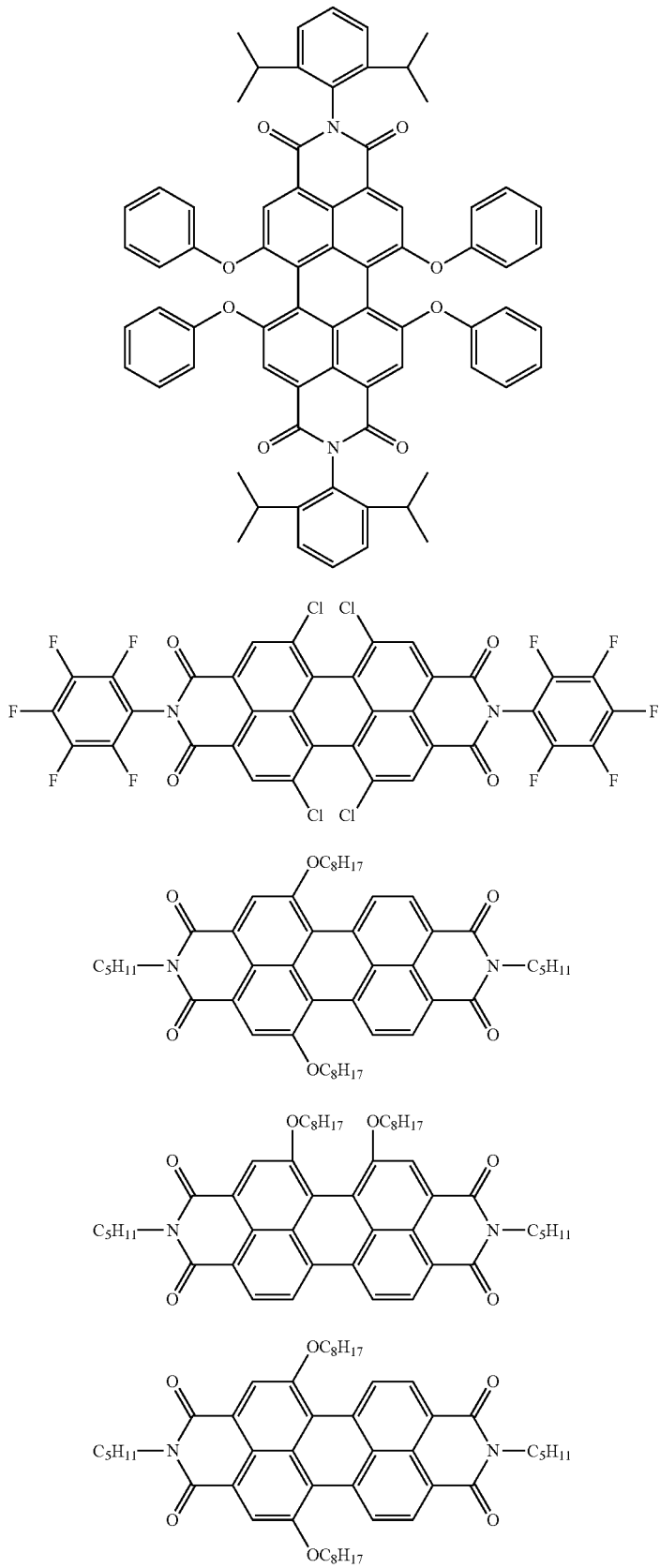

-continued
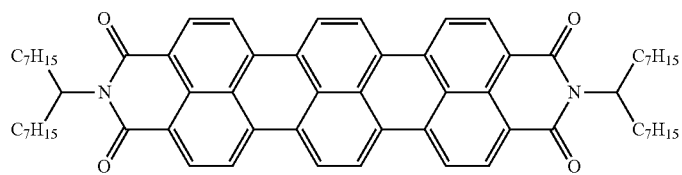
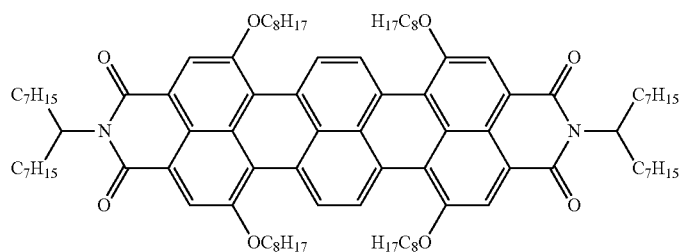
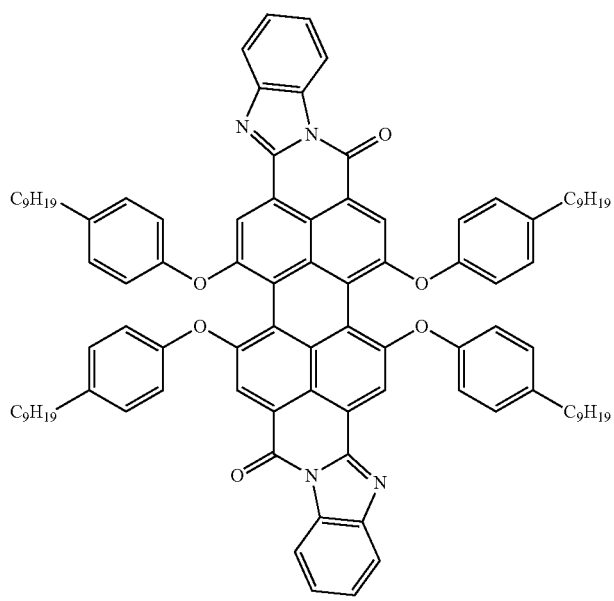
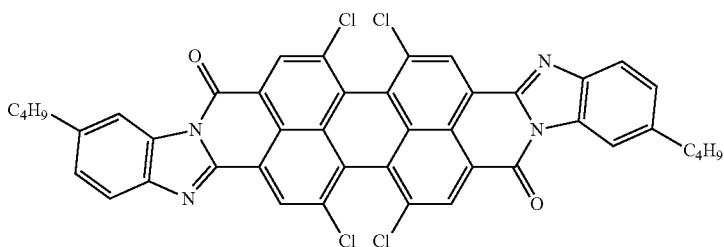
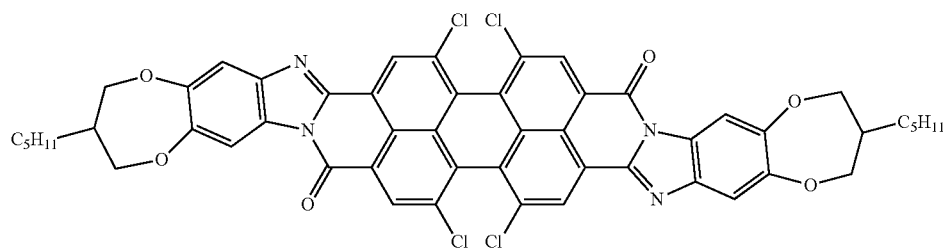

-continued
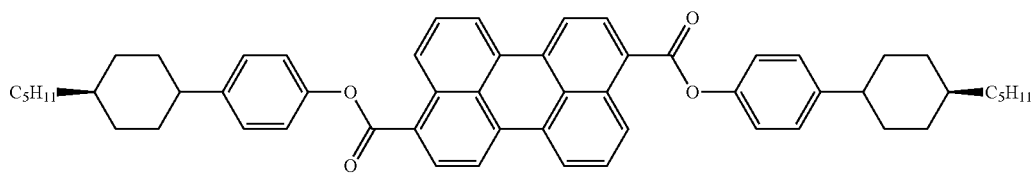
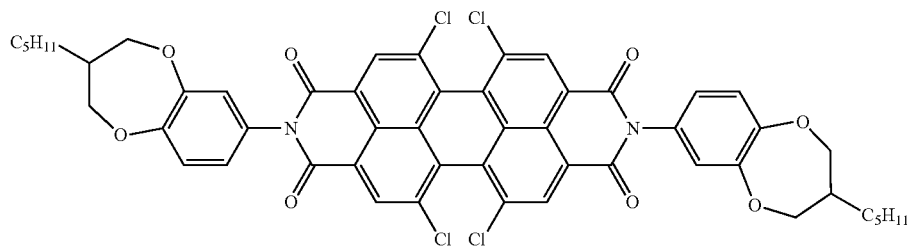
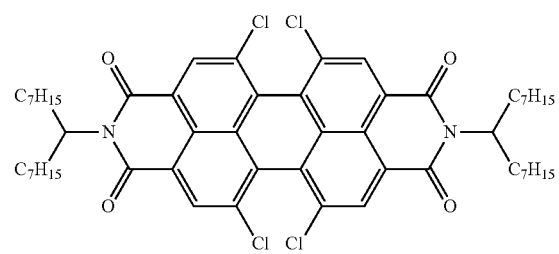
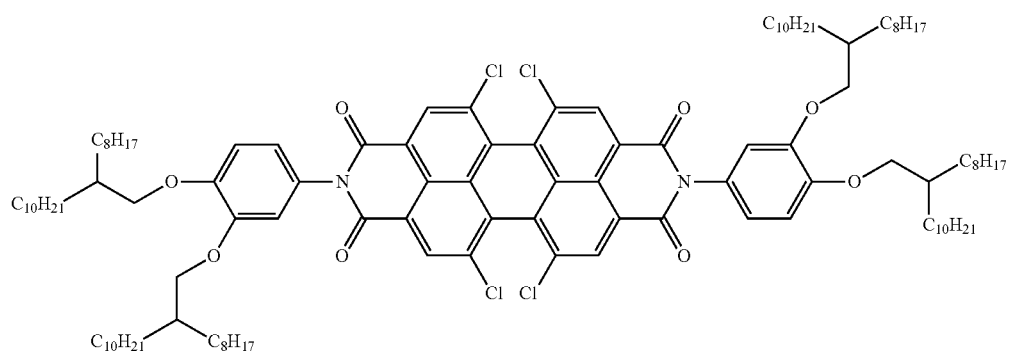
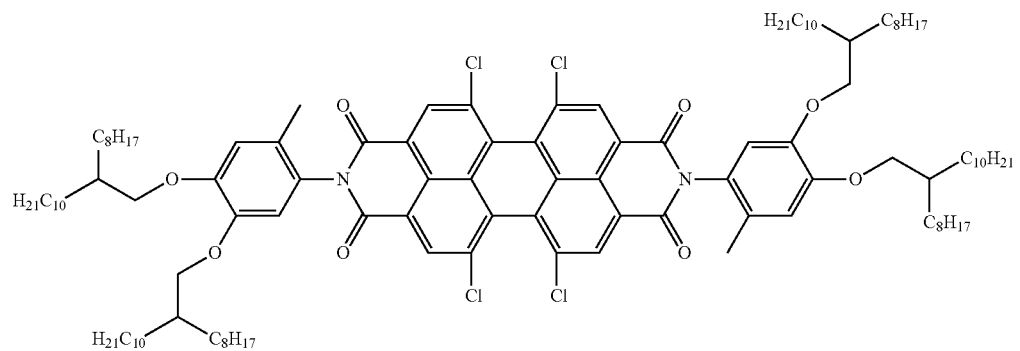

-continued
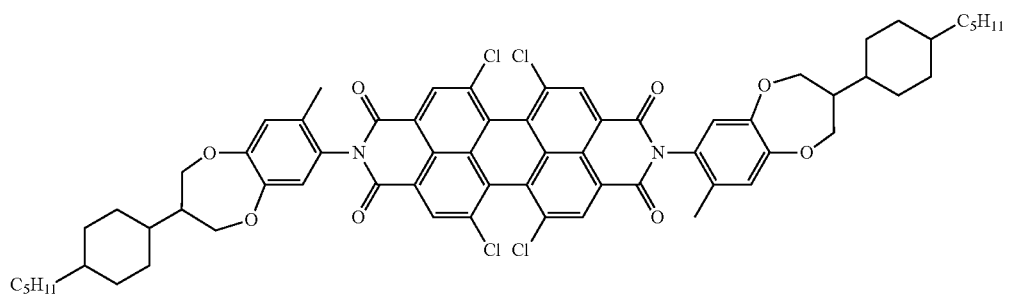
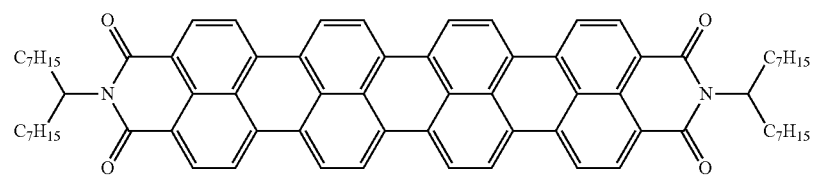
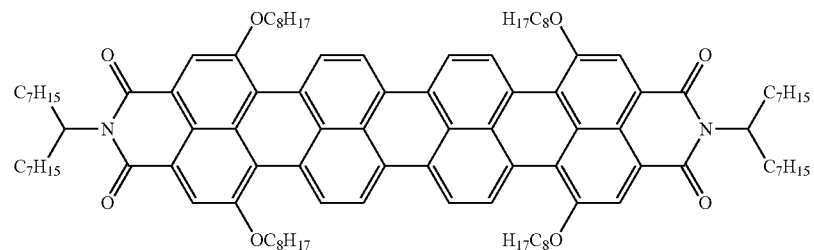
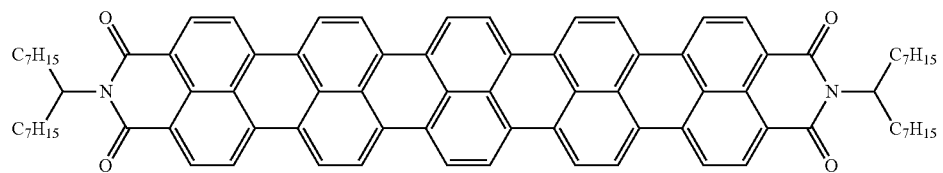
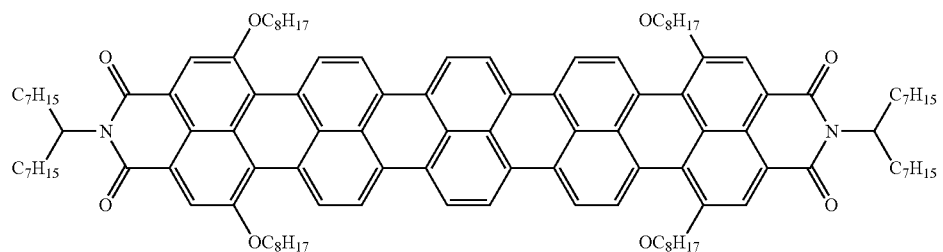
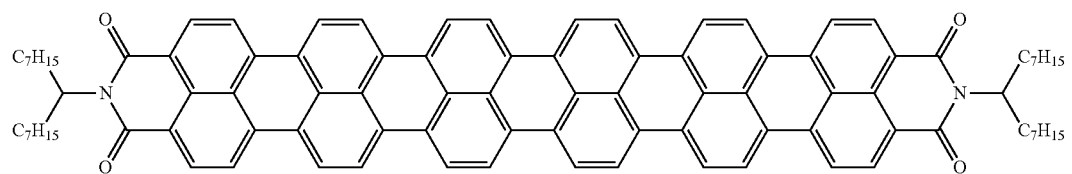

-continued
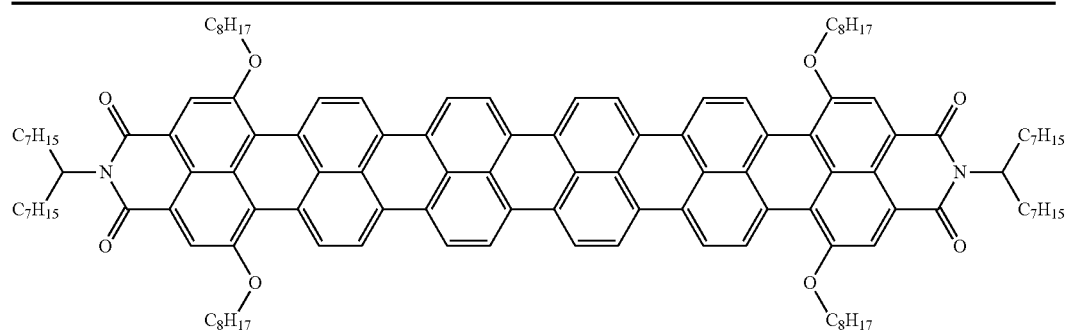
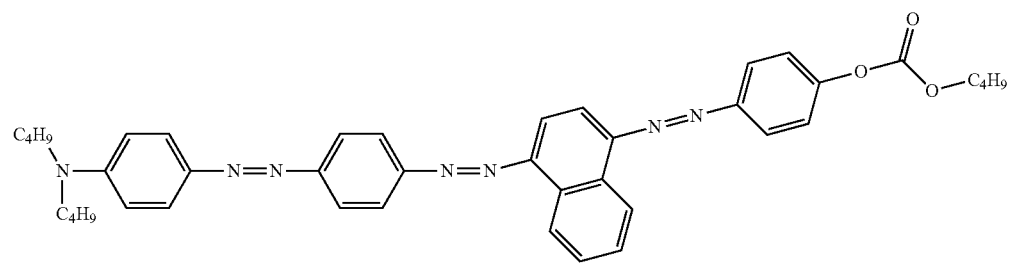
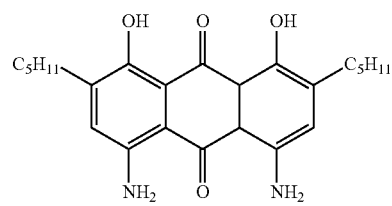
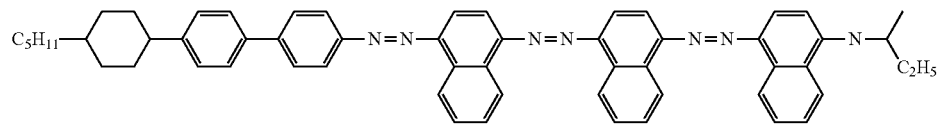
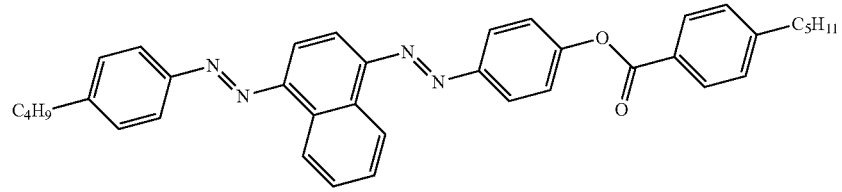
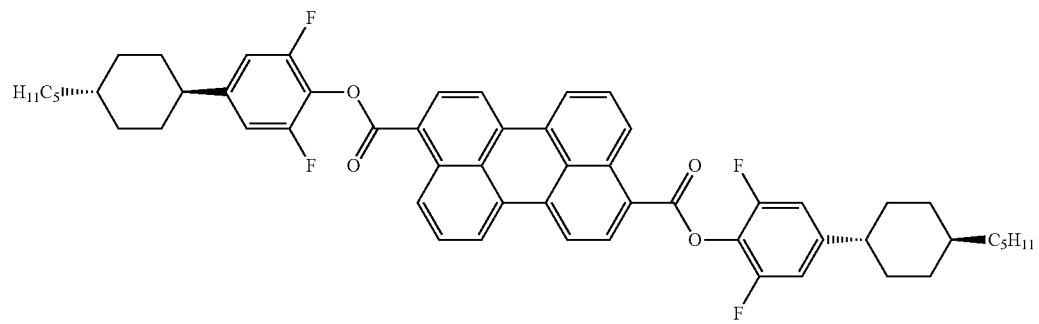

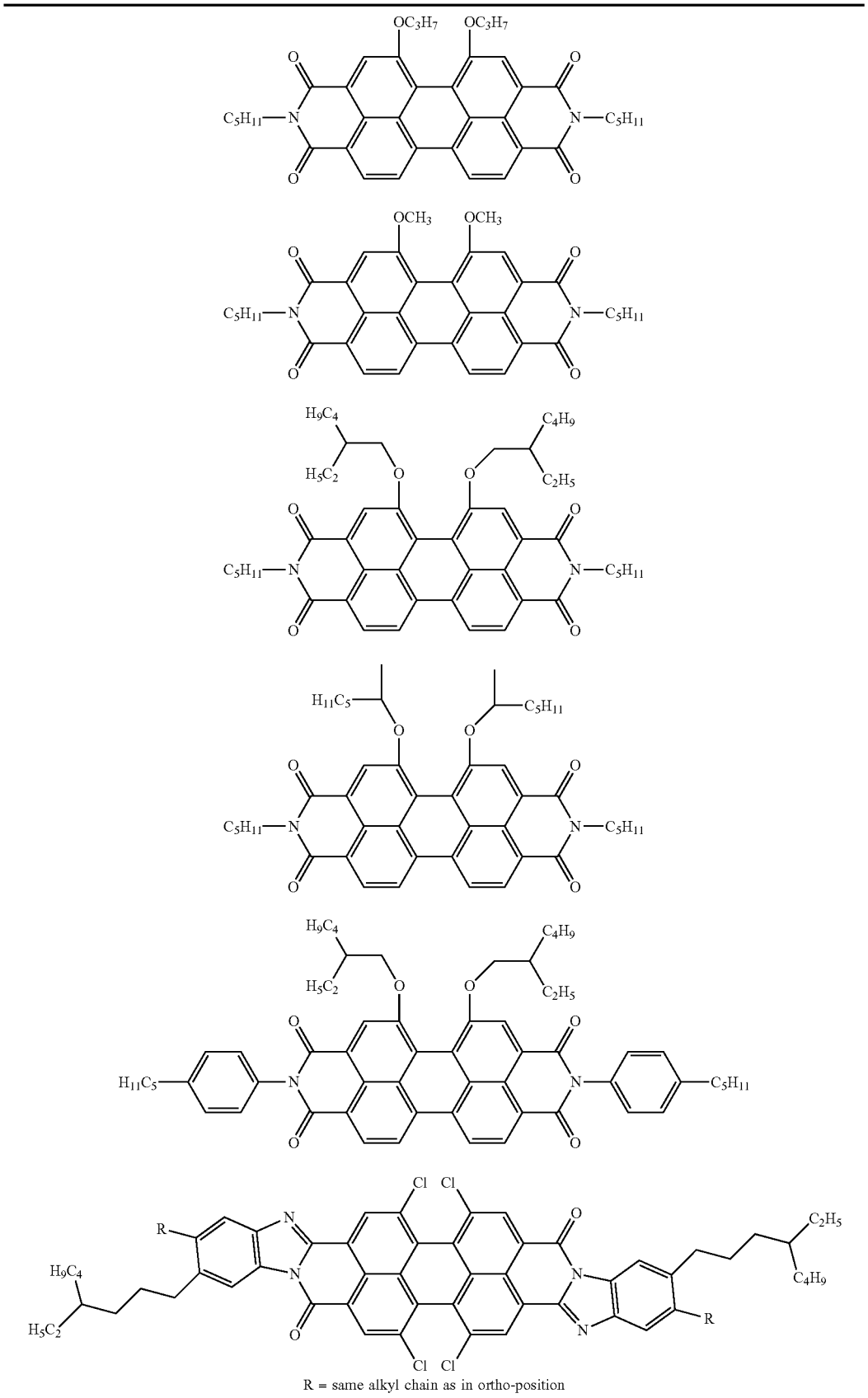
R = same alkyl chain as in ortho-position

-continued
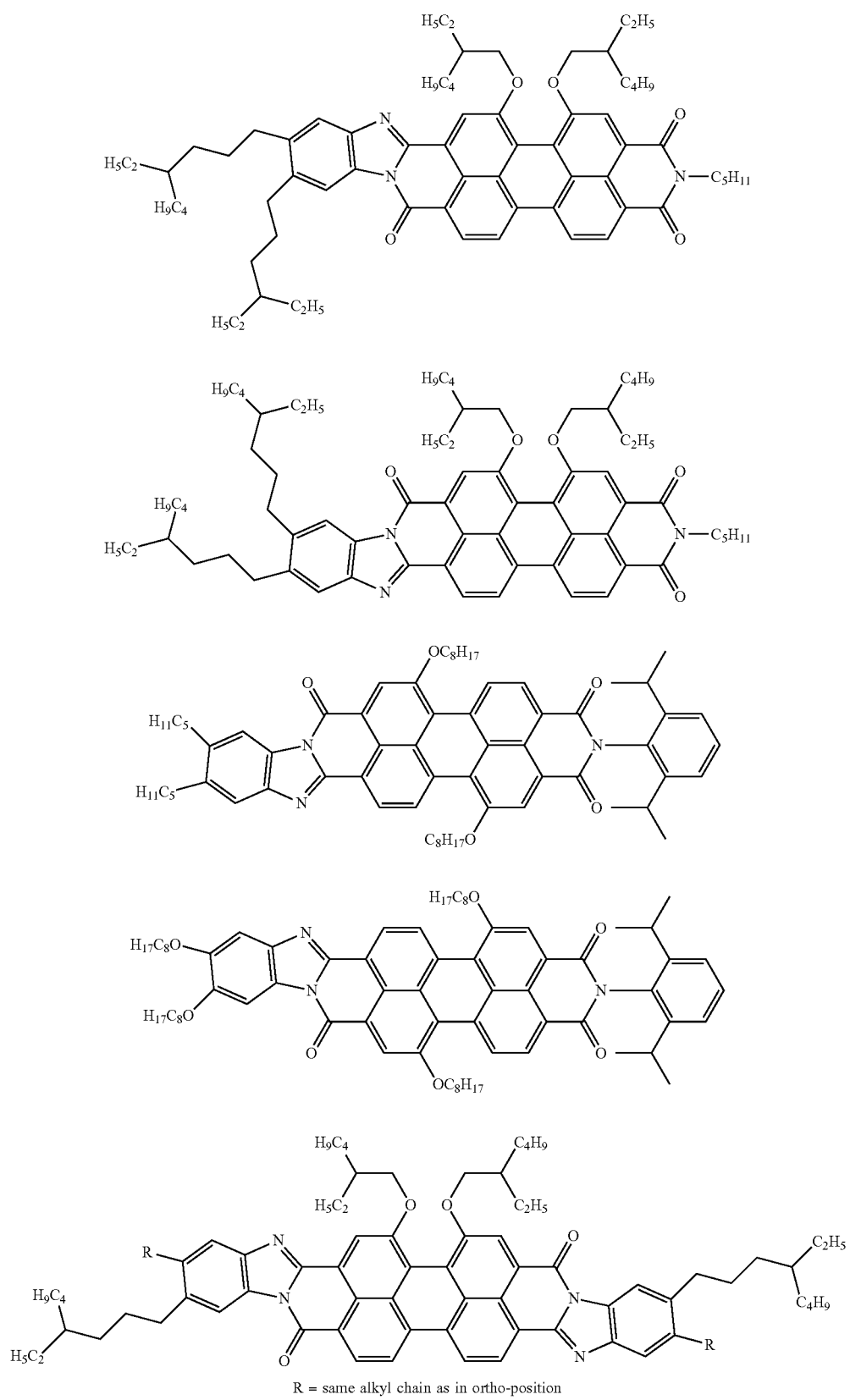
R = same alkyl chain as in ortho-position

It is particularly preferred for the three following dyes:
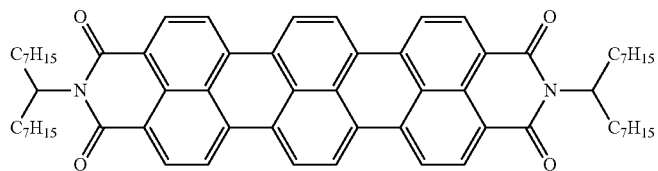
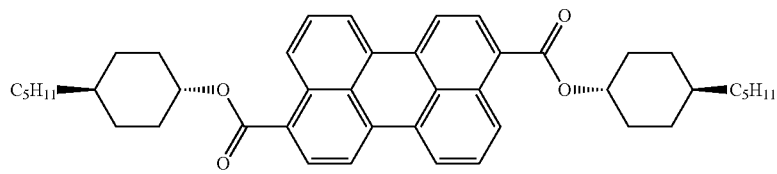
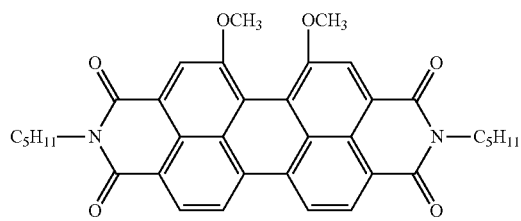
to be employed in combination with one another in the liquid-crystalline medium according to the invention.
It is alternatively preferred for the three following dyes:
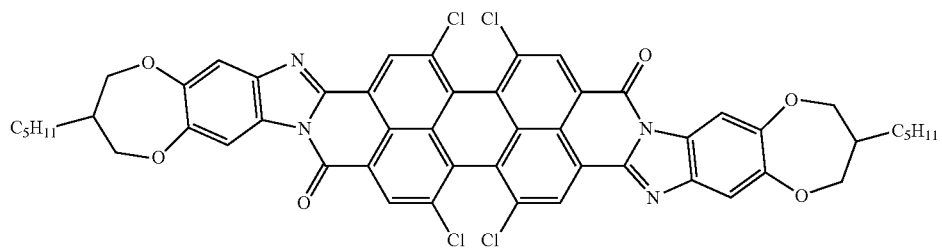
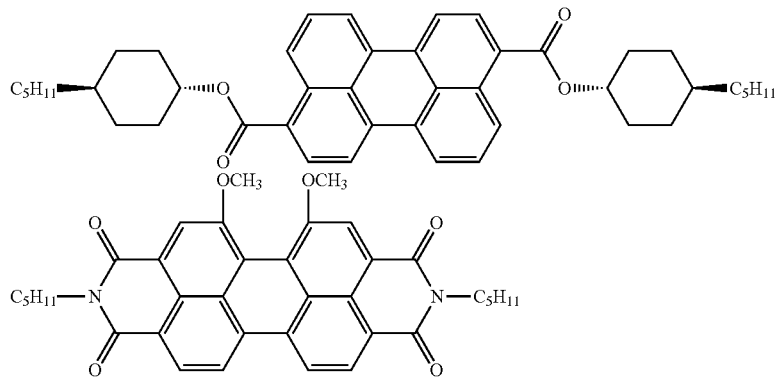
to be employed in combination with one another in the liquid-crystalline medium according to the invention.

It is alternatively preferred for the three following dyes:

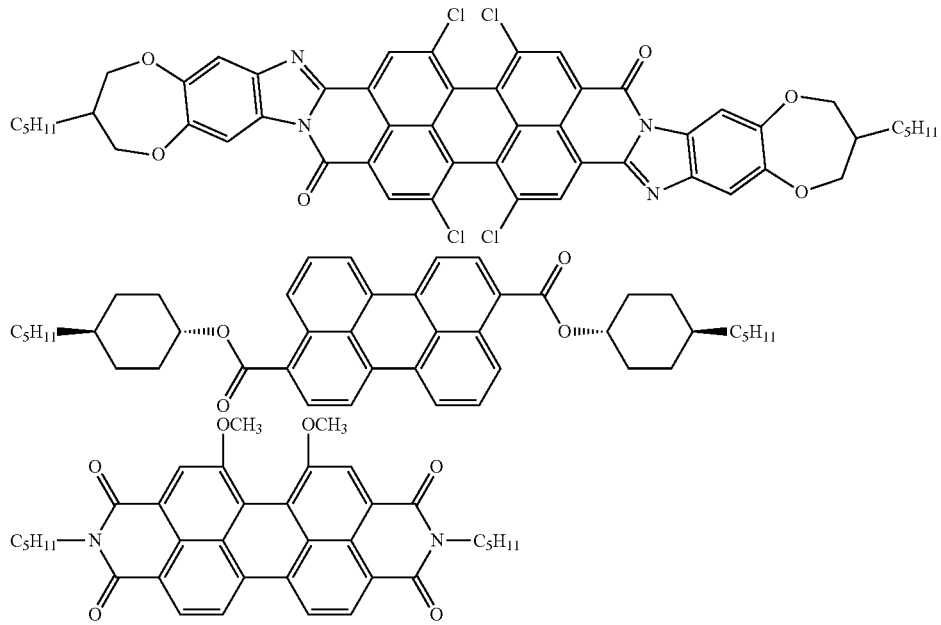

to be employed in combination with one another in the liquid-crystalline medium according to the invention.

In the above-mentioned cases, further dyes may be present in the liquid-crystalline, or the dyes indicated above may be the only dyes in the liquid-crystalline medium according to the invention.

The liquid-crystalline medium according to the invention is preferably prepared by firstly mixing the further components of the liquid-crystalline medium without adding the dichroic dye. The dichroic dye is subsequently added to the liquid-crystalline medium and dissolved therein, preferably at elevated temperature compared with room temperature, particularly preferably at greater than 40° C., very particularly preferably at greater than 50° C.

The present invention likewise relates to the said process for the preparation of the liquid-crystalline medium according to the invention.

The liquid-crystalline medium according to the invention is preferably nematic liquid-crystalline at the operating temperature of the LC device of the guest-host type. It is particularly preferably nematic liquid-crystalline in a range of +−20° C., very particularly preferably in a range of +−30° C. above and below the operating temperature of the LC device of the guest-host type.

Alternatively, the liquid-crystalline medium according to the invention may be cholesterically liquid-crystalline at the operating temperature of the LC device of the guest-host type.

The liquid-crystalline medium according to the invention furthermore preferably has a clearing point, preferably a phase transition from a nematic liquid-crystalline state to an isotropic state, in the temperature range from 70° C. to 170° C., preferably from 90° C. to 160° C., particularly preferably from 95° C. to 150° C. and very particularly preferably from 105° C. to 140° C.

Furthermore, the dielectric anisotropy of the liquid-crystalline medium according to the invention is preferably greater than 3, particularly preferably greater than 7.

Alternatively, it may be preferred for the dielectric anisotropy of the liquid-crystalline medium according to the invention to be less than −2, preferably less than −3.

The liquid-crystalline medium according to the invention furthermore preferably comprises 3 to 20 different liquid-crystalline compounds, preferably 8 to 18, particularly preferably 12 to 16 different liquid-crystalline compounds.

It is furthermore preferred for the liquid-crystalline medium according to the invention to comprise one or more compounds which contain a nitrile group.

It particularly preferably comprises one or more compounds of the formula (I)

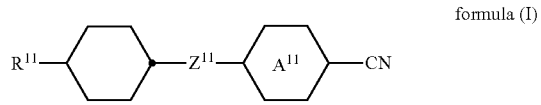

formula (I)

where:
$R^{11}$ is on each occurrence, identically or differently, H, F, Cl, CN, NCS, $R^1$—O—CO—, $R^1$—CO—O—, an alkyl, alkoxy or thioalkoxy group having 1 to 10 C atoms, or an alkenyl, alkenyloxy or thioalkenyloxy group having 2 to 10 C atoms, where one or more H atoms in the above-mentioned groups may be replaced by F, Cl or CN, and where one or more $CH_2$ groups in the above-mentioned groups may be replaced by O, S, —O—CO— or —CO—O—,
$R^1$ is on each occurrence, identically or differently, an alkyl group having 1 to 10 C atoms, in which one or more hydrogen atoms may be replaced by F or Cl, and in which one or more $CH_2$ groups may be replaced by O or S,
$Z^{11}$ is selected on each occurrence, identically or differently, from —CO—O—, —O—CO—, —$CF_2$—$CF_2$—, —$CF_2$—O—, —O—$CF_2$—, —$CH_2$—$CH_2$—, —CH═CH—, —CF═CF—, —CF═CH—, —CH═CF—, —C≡C—, —$OCH_2$—, —$CH_2O$— and a single bond, and $A^{11}$ is selected from

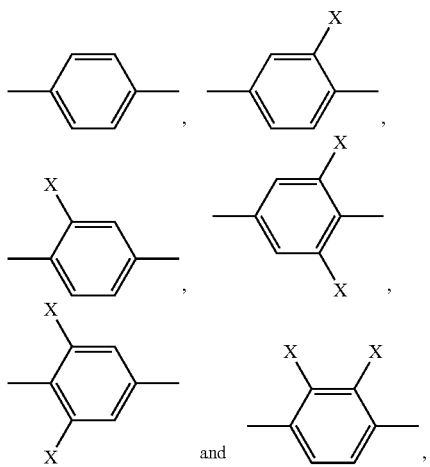

and

X is selected on each occurrence, identically or differently, from F, Cl, CN or an alkyl, alkoxy or alkylthio group having 1 to 10 C atoms, where one or more hydrogen atoms in the above-mentioned groups may be replaced by F or Cl, and where one or more $CH_2$ groups in the above-mentioned groups may be replaced by O or S.

The rings

for example

are abbreviated to "$A^{xx}$", for example "$A^{11}$", in continuous text in the present application in order to improve legibility.

The liquid-crystalline medium preferably furthermore comprises one or more compounds of the formula (II)

formula (II)

where:

$R^{21}$, $R^{22}$ are on each occurrence, identically or differently, H, F, Cl, CN, NCS, $R^1$—O—CO—, $R^1$—CO—O—, an alkyl, alkoxy or thioalkoxy group having 1 to 10 C atoms, or an alkenyl, alkenyloxy or thioalkenyloxy group having 2 to 10 C atoms, where one or more H atoms in the above-mentioned groups may be replaced by F, Cl or CN, and where one or more $CH_2$ groups in the above-mentioned groups may be replaced by O, S, —O—CO— or —CO—O—, $R^1$ is defined as above, $Z^{21}$, $Z^{22}$ are selected on each occurrence, identically or differently, from —CO—O—, —O—CO—, —$CF_2$—$CF_2$—, —$CF_2$—O—, —O—$CF_2$—, —$CH_2$—$CH_2$—, —CH=CH—, —CF=CF—, —CF=CH—, —CH=CF—, —C≡C—, —$OCH_2$—, —$CH_2$O— and a single bond, and $A^{21}$, $A^{22}$, $A^{23}$ are selected on each occurrence, identically or differently, from

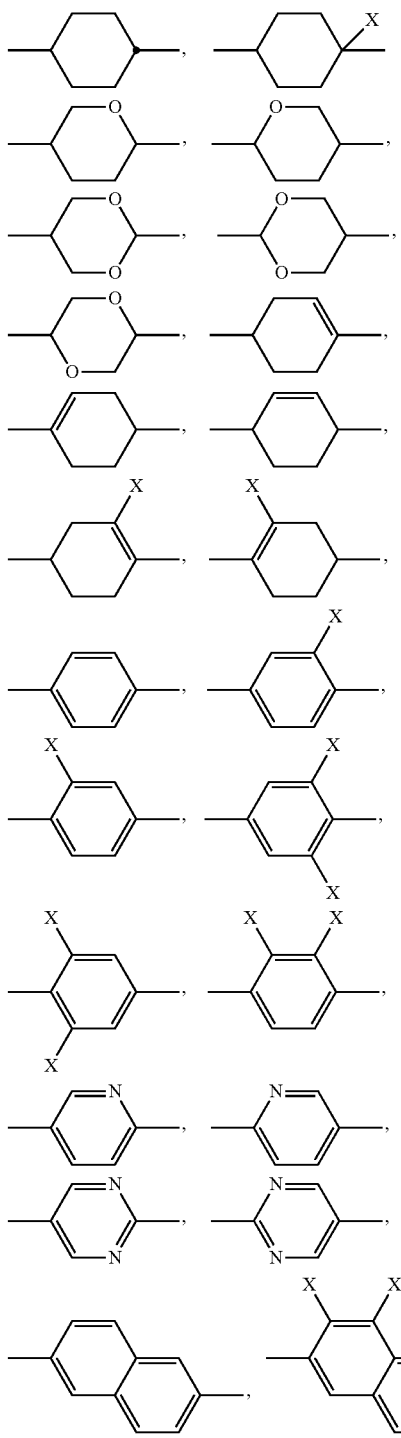

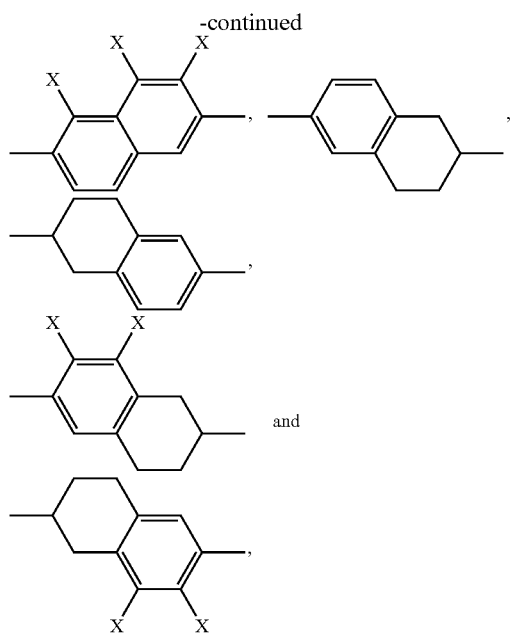

X is defined as above, and
where the compound of the formula (II) carries at least two fluorine substituents.

The liquid-crystalline medium preferably furthermore comprises one or more compounds of the formula (III)

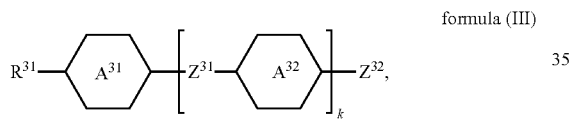
formula (III)

where:
$R^{31}$, $R^{32}$ are on each occurrence, identically or differently, H, F, Cl, CN, NCS, $R^1$—O—CO—, $R^1$—CO—O—, an alkyl, alkoxy or thioalkoxy group having 1 to 10 C atoms, or an alkenyl, alkenyloxy or thioalkenyloxy group having 2 to 10 C atoms, where one or more H atoms in the above-mentioned groups may be replaced by F, Cl or CN, and where one or more $CH_2$ groups in the above-mentioned groups may be replaced by O, S, —O—CO— or —CO—O—,
$R^1$ is defined as above,
$Z^{31}$ is selected on each occurrence, identically or differently, from —CO—O—, —O—CO—, —$CF_2$—$CF_2$—, —$CF_2$—O—, —O—$CF_2$—, —$CH_2$—$CH_2$—, —CH=CH—, —CF=CF—, —CF=CH—, —CH=CF—, —C≡C—, —$OCH_2$—, —$CH_2$O— and a single bond, and
$A^{31}$, $A^{32}$ are selected on each occurrence, identically or differently, from

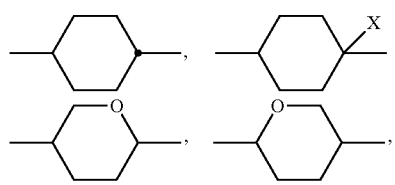

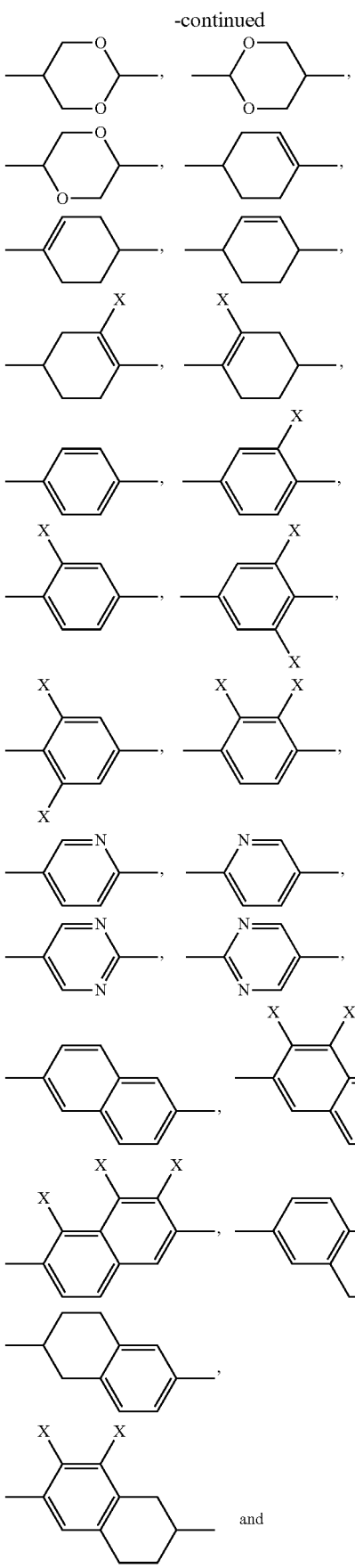

-continued

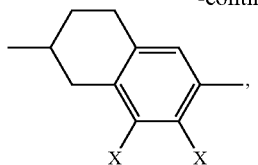

X is defined as above, and
k is 3, 4 or 5.
The units

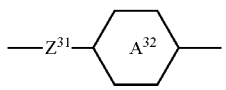

here may be identical or different on each occurrence.

The liquid-crystalline medium according to the invention preferably comprises one or more compounds selected from compounds of the formula (I) as defined above and additionally one or more compounds of the formula (II) as defined above and additionally one or more compounds of the formula (III) as defined above.

The liquid-crystalline medium according to the invention preferably comprises 10-60% by weight of the compound of the formula (I), particularly preferably 20-50% by weight, very particularly preferably 25-40% by weight.

The liquid-crystalline medium according to the invention furthermore preferably, and preferably in combination with the above-mentioned preferred proportion of the compounds of the formula (I), comprises 20-60% by weight of the compound of the formula (II), preferably 30-50% by weight.

The liquid-crystalline medium according to the invention furthermore preferably, and preferably in combination with the above-mentioned preferred proportion of the compounds of the formula (I) and/or of the formula (II), comprises 15-45% by weight of the compound of the formula (III), preferably 25-35% by weight.

A compound of the formula (III) is preferably present in the liquid-crystalline medium in a proportion of at least 6% by weight, preferably at least 9% by weight and particularly preferably at least 12% by weight.

It is furthermore preferred for the liquid-crystalline medium that the ratio of the proportions of compounds of the formula (I) to compounds of the formula (II) is between 1:0.9 and 1:5, particularly preferably between 1:1 and 1:2 and very particularly preferably between 1:1.05 and 1:1.6, where the proportions are indicated in % by weight.

Examples of compounds of the formula (I), (II) or (III) which can be used in the liquid-crystalline medium are indicated in the following table:

The following compounds are examples of compounds of the formula (I):

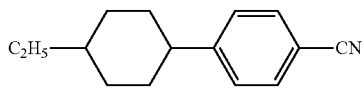

CP-2-N

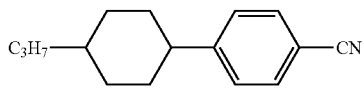

CP-3-N

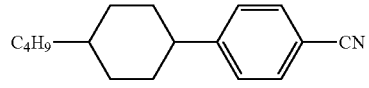

CP-4-N

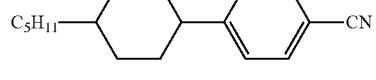

CP-5-N

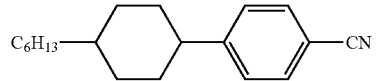

CP-6-N

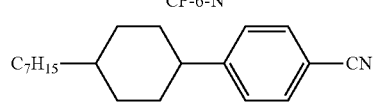

CP-7-N

CP-V-N

CP-1V-N

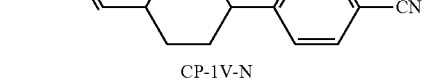

CP-V2-N

CG-2-N

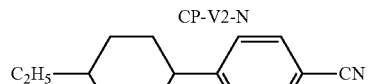

CG-3-N

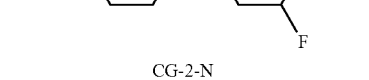

CG-4-N

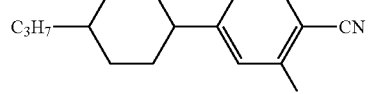

CG-5-N

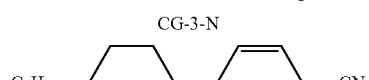

CG-6-N

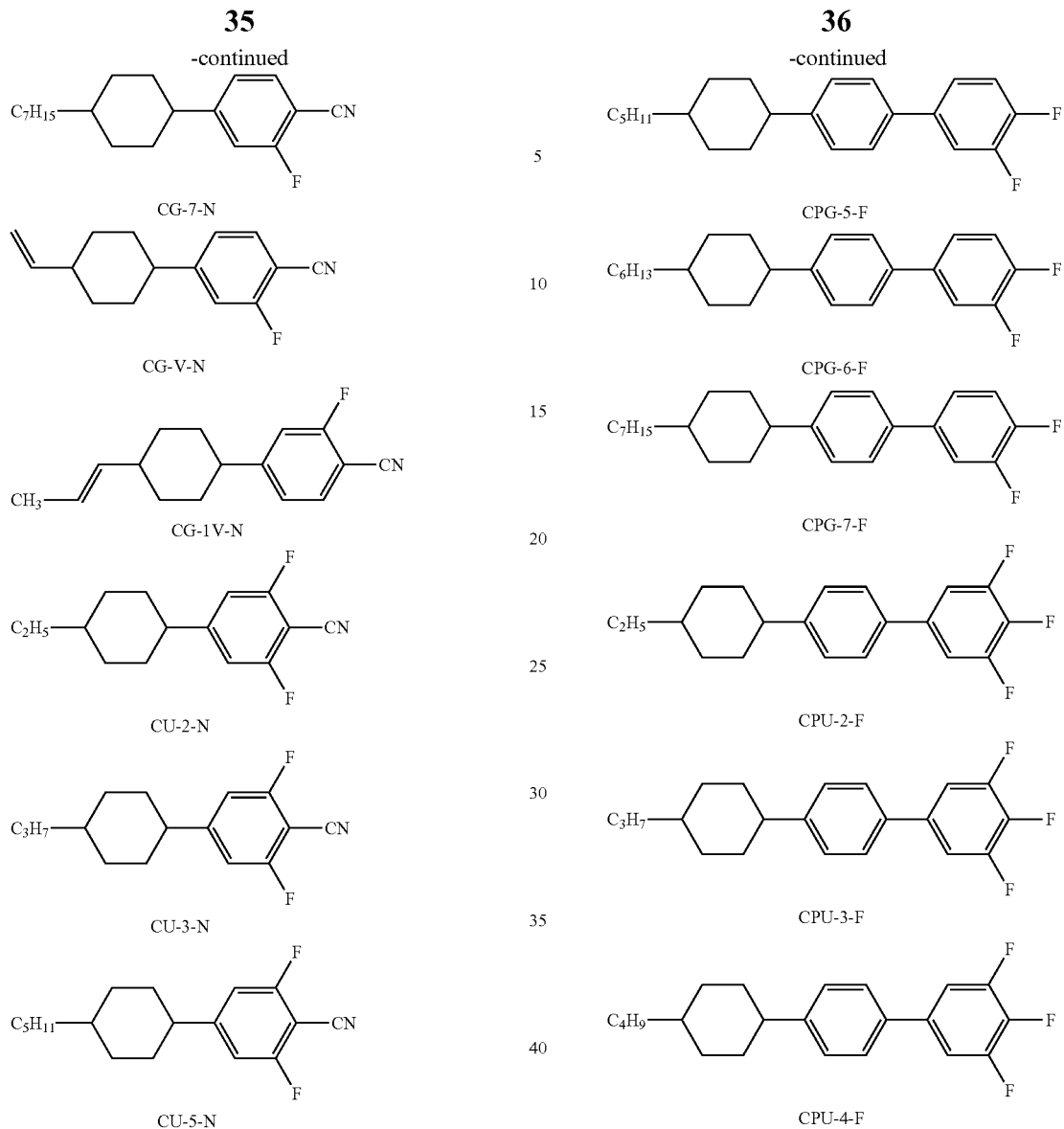
The following compounds are examples of compounds of the formula (II):
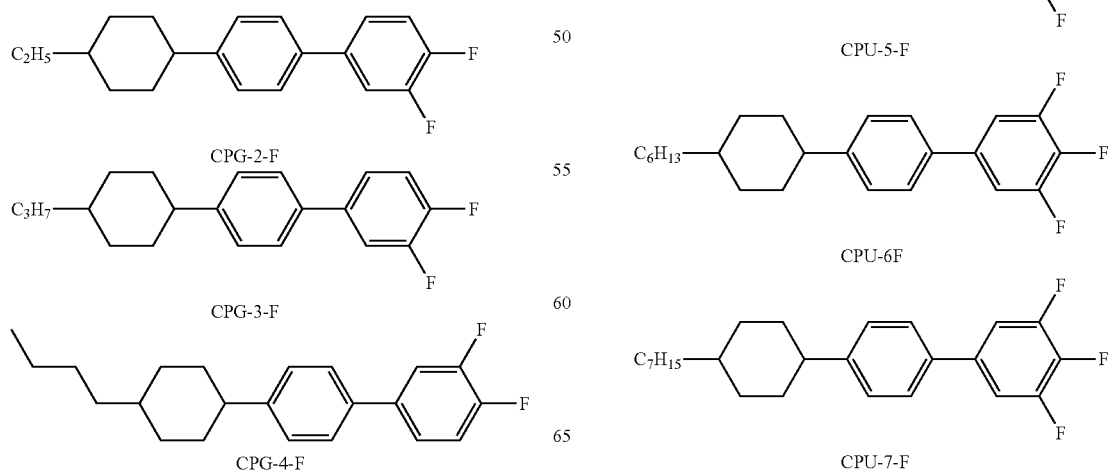

-continued
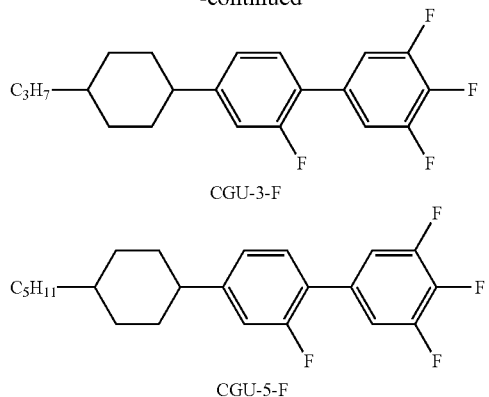
CGU-3-F
CGU-5-F
-continued
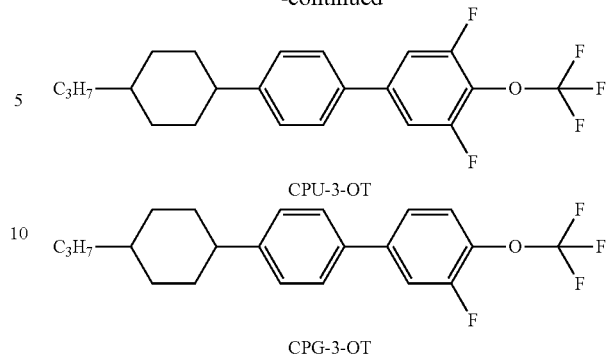
CPU-3-OT
CPG-3-OT
The following compounds are examples of compounds of the formula (III):
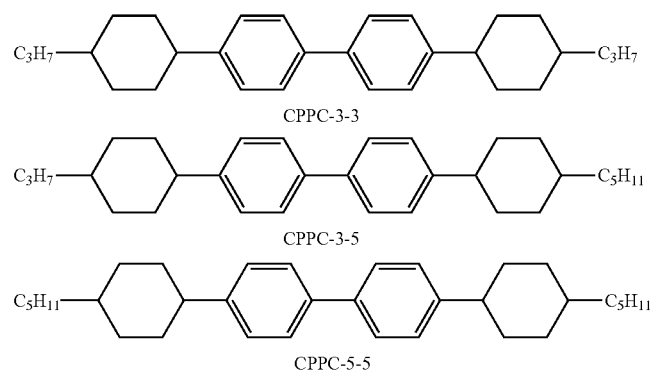
CPPC-3-3
CPPC-3-5
CPPC-5-5
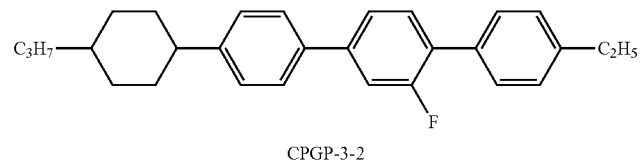
CPGP-3-2
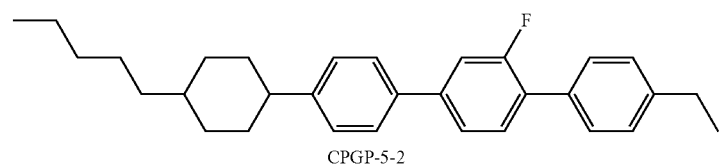
CPGP-5-2
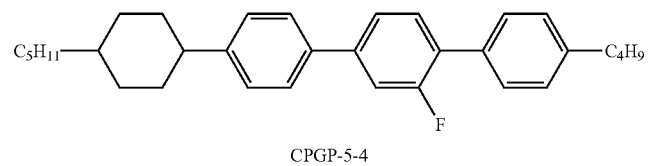
CPGP-5-4
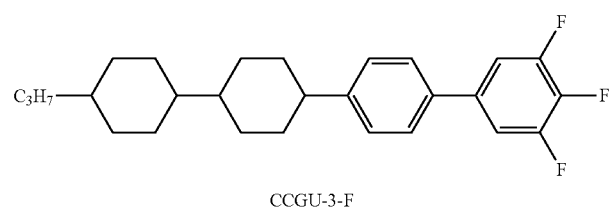
CCGU-3-F

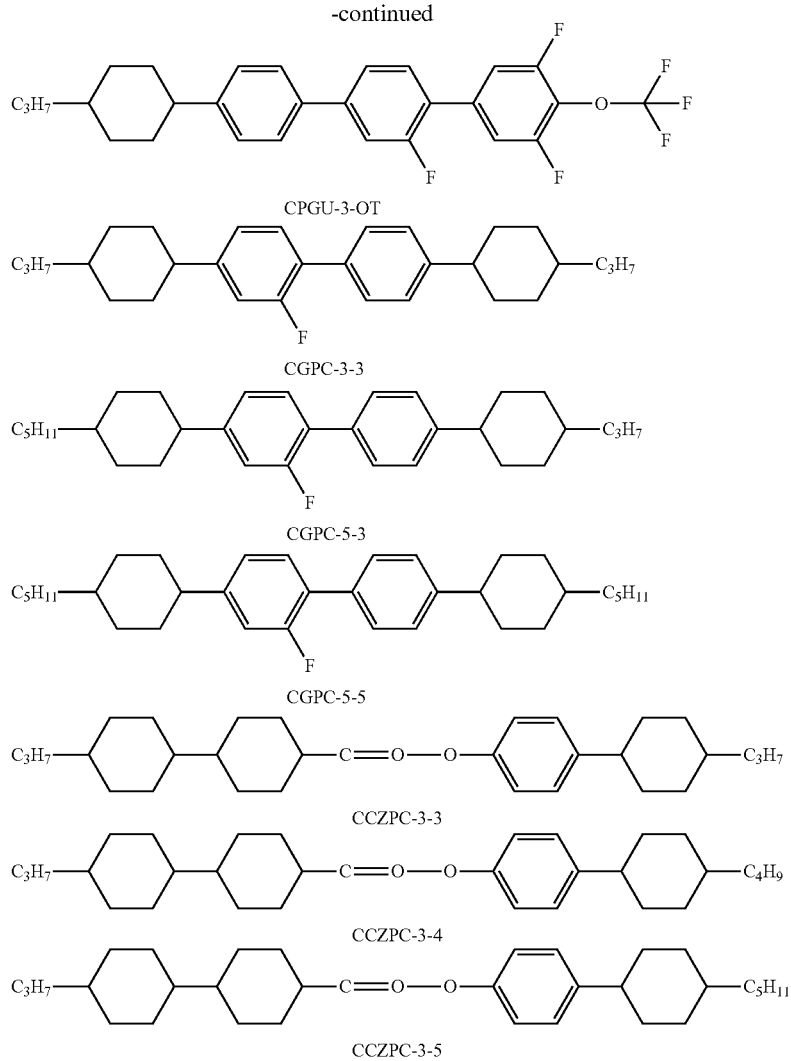

It is preferred in accordance with the invention for the liquid-crystalline medium according to the invention to comprise one or more chiral dopants. In this case, the molecules of the liquid-crystalline medium are preferably twisted with respect to one another in the LC device of the guest-host type, particularly preferably as known from the TN mode of displays.

Chiral dopants are preferably used in the liquid-crystalline medium according to the invention in a total concentration of 0.01% to 3%, particularly preferably 0.05% to 1%. In order to obtain high values for the twist, the total concentration of the chiral dopants may also be selected higher than 3%, preferably up to a maximum of 10%.

According to an alternative, likewise preferred embodiment, the liquid-crystalline medium according to the invention comprises no chiral dopants. In this case, the molecules of the liquid-crystalline medium are preferably not twisted with respect to one another in the LC device of the guest-host type. In this case, the LC device is particularly preferably in antiparallel mode.

The proportions of these compounds and other components present in small amounts are neglected when specifying the proportions of the liquid-crystalline compounds and dichroic dyes.

Preferred dopants are the compounds depicted in the following table:

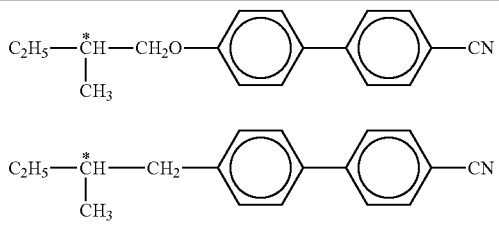

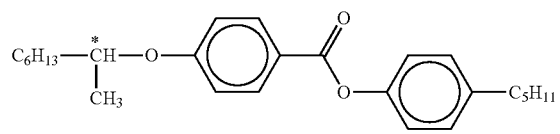
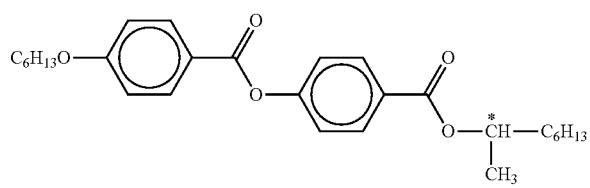
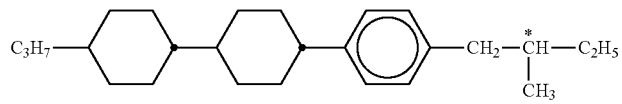
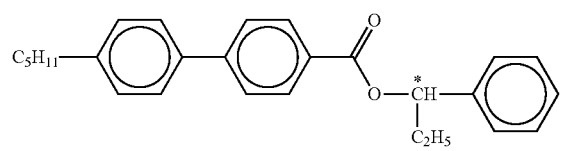
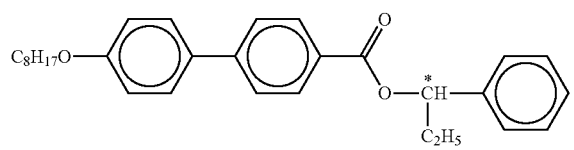
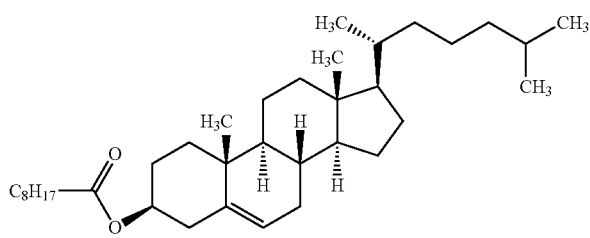
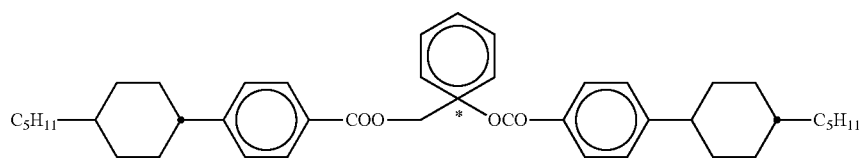
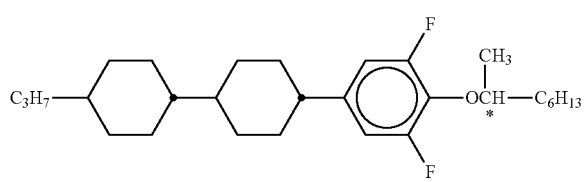
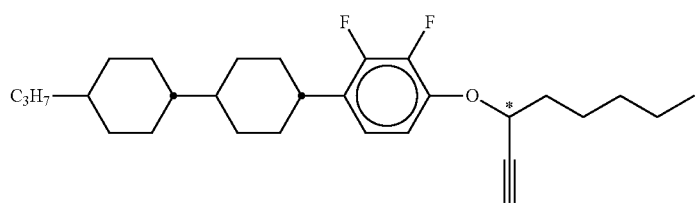

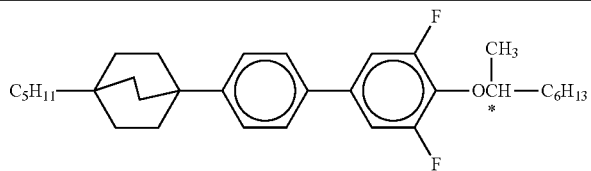

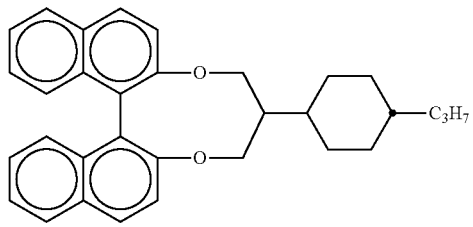

The liquid-crystalline medium according to the invention furthermore preferably comprises one or more stabilisers. The total concentration of the stabilisers is preferably between 0.00001% and 10%, particularly preferably between 0.0001% and 1% of the mixture as a whole. The proportions of these compounds and other components present in small amounts are neglected when specifying the proportions of the liquid-crystalline compounds and dichroic dyes.

Preferred stabiliser compounds are shown in the following table:

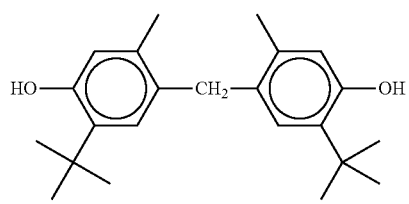
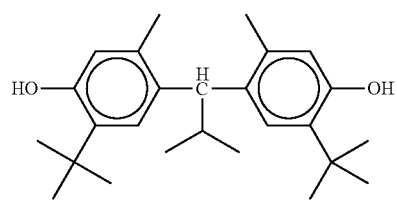
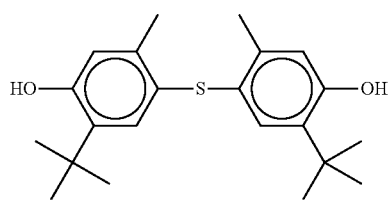
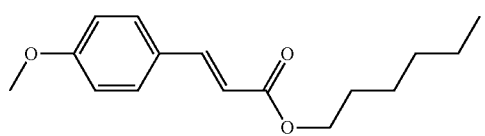 [SMILES: CCCCCCOC(=O)/C=C/c1ccc(OC)cc1]
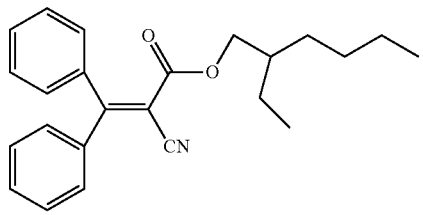 [SMILES: CCCCC(CC)COC(=O)C(C#N)=C(c1ccccc1)c1ccccc1]
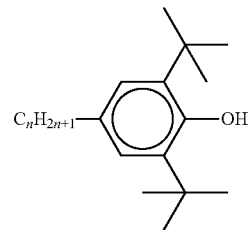
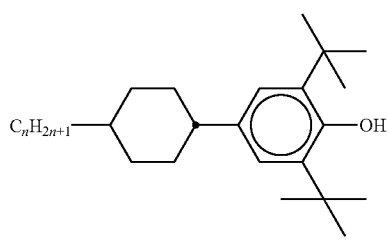
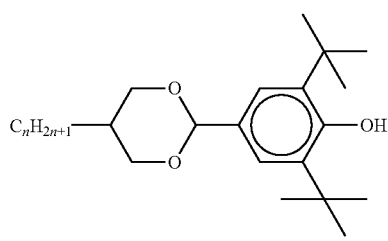

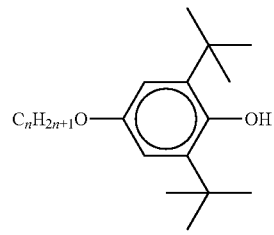
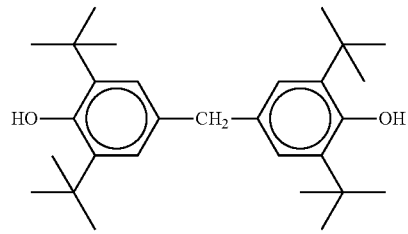
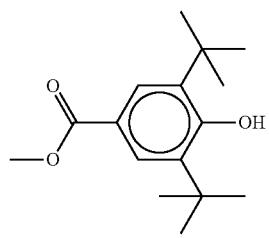
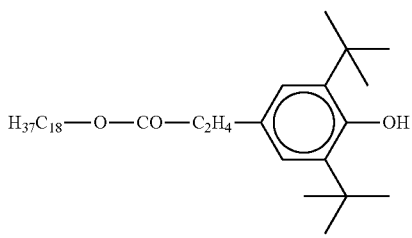
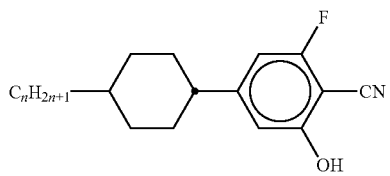
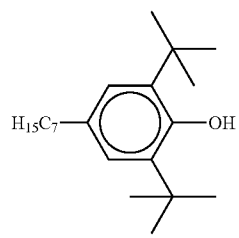
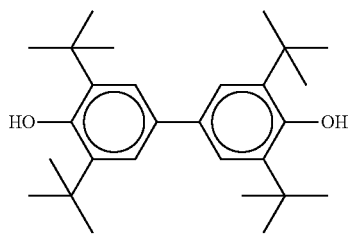
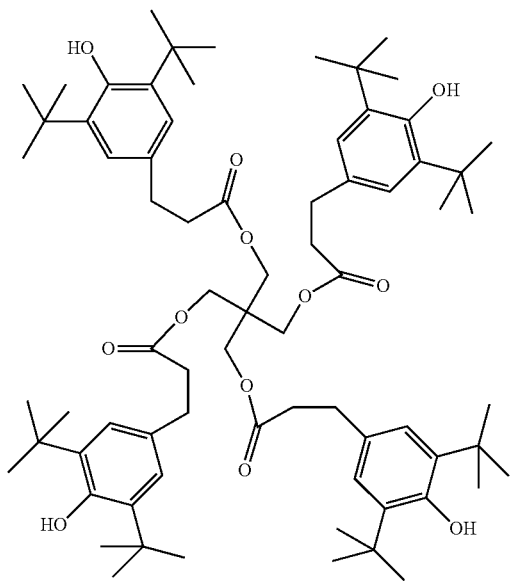 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
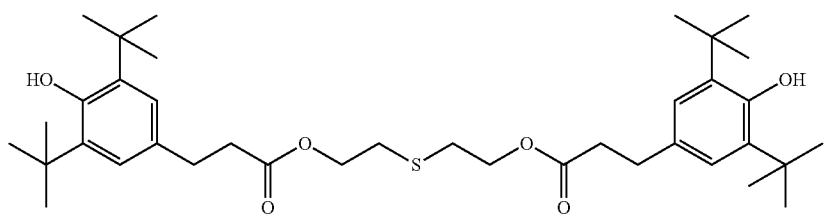 [SMILES: CC(C)(C)c1cc(CCC(=O)OCCSCCOC(=O)CCc2cc(C(C)(C)C)c(O)c(C(C)(C)C)c2)cc(C(C)(C)C)c1O]

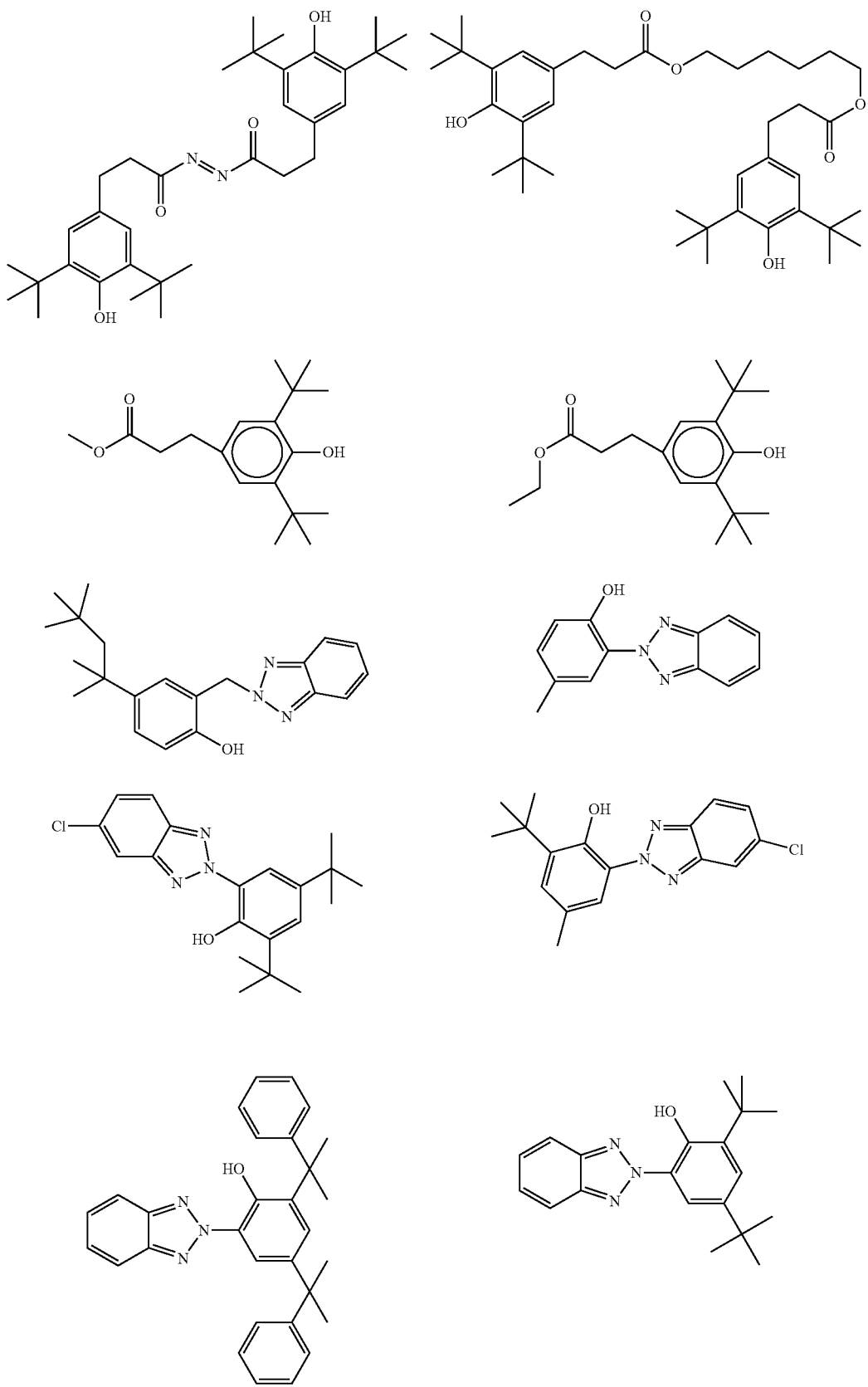

-continued
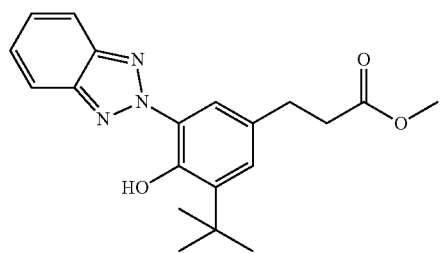 [SMILES: COC(=O)CCc1cc(-n2nc3ccccc3n2)c(O)c(C(C)(C)C)c1]
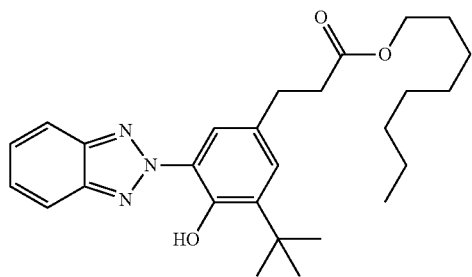 [SMILES: CCCCCCCCOC(=O)CCc1cc(-n2nc3ccccc3n2)c(O)c(C(C)(C)C)c1]
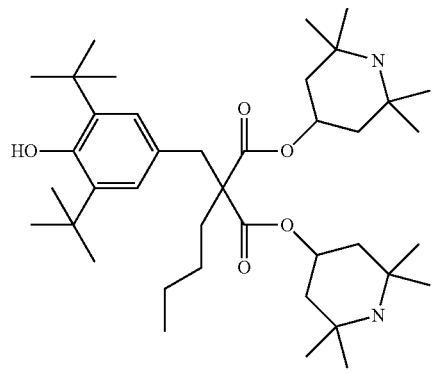 [SMILES: CCCCC(Cc1cc(C(C)(C)C)c(O)c(C(C)(C)C)c1)(C(=O)OC1CC(C)(C)NC(C)(C)C1)C(=O)OC1CC(C)(C)NC(C)(C)C1]
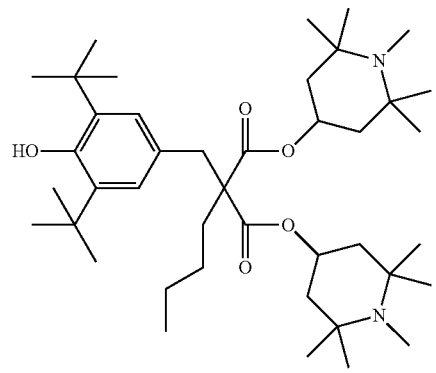 [SMILES: CCCCC(Cc1cc(C(C)(C)C)c(O)c(C(C)(C)C)c1)(C(=O)OC1CC(C)(C)N(C)C(C)(C)C1)C(=O)OC1CC(C)(C)N(C)C(C)(C)C1]
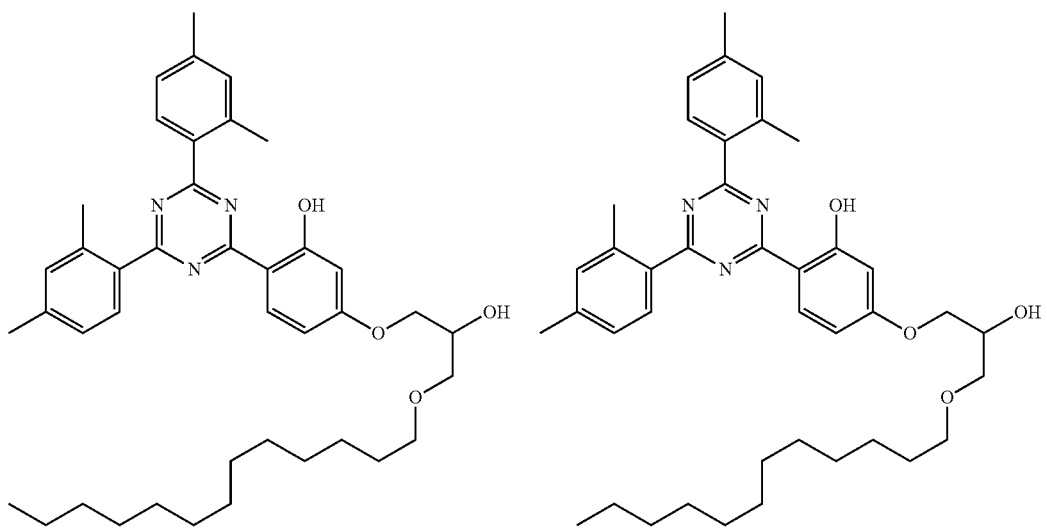

-continued
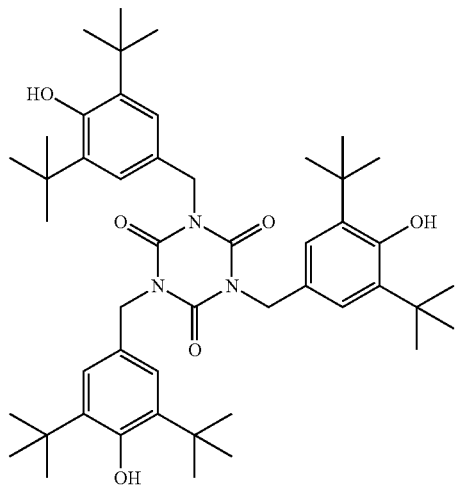 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
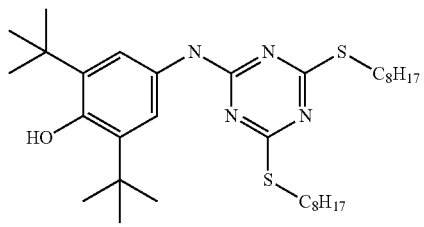
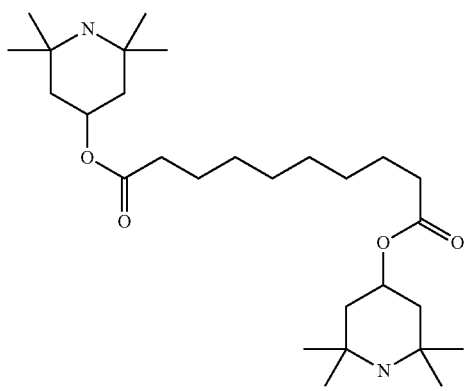
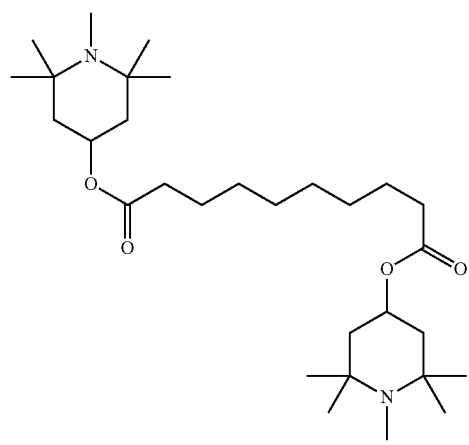
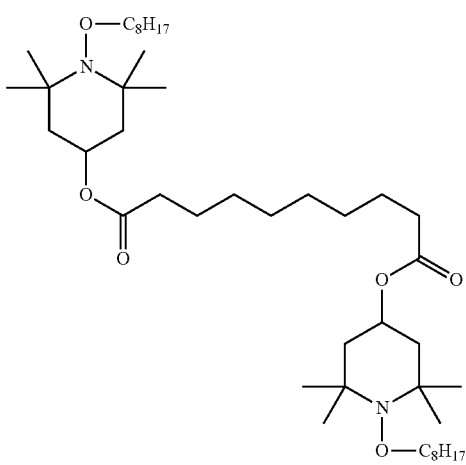
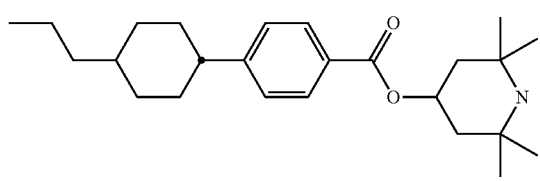

-continued

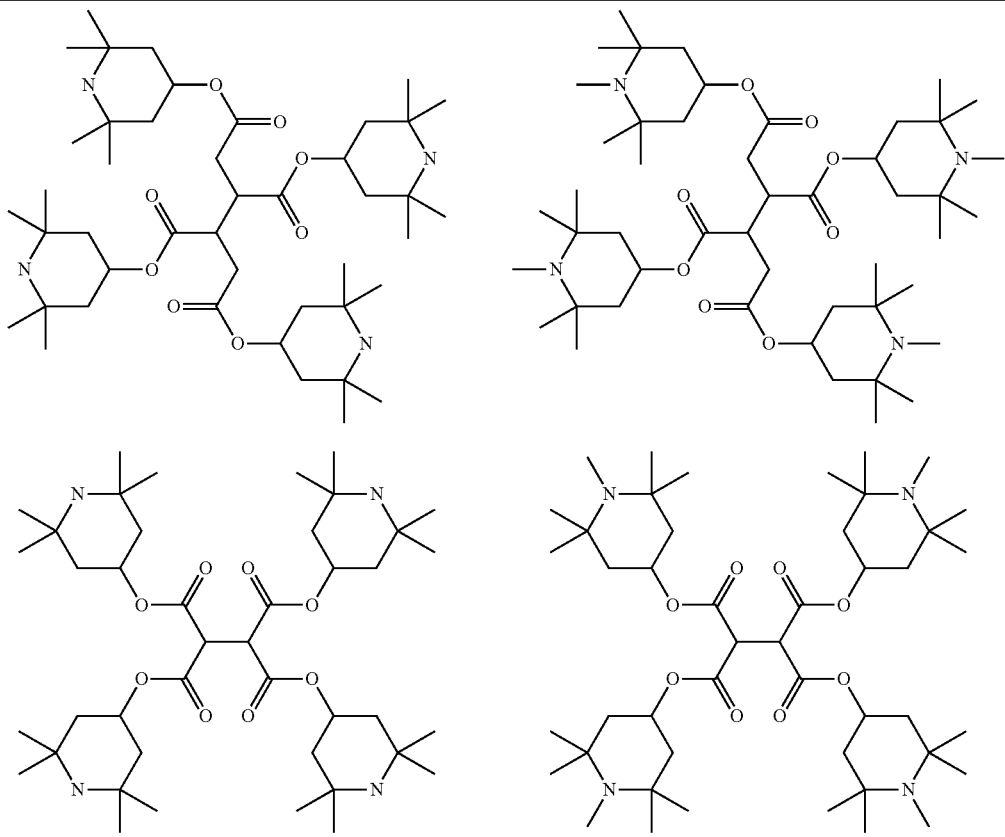

The invention furthermore relates to the use of the liquid-crystalline medium according to the invention in an LC device of the guest-host type.

The preferred embodiments of the dichroic compound F are likewise preferred here, as are the other preferred embodiments indicated above in connection with the liquid-crystalline medium according to the invention.

The invention furthermore relates to an LC device of the guest-host type, containing a liquid-crystalline medium which comprises at least one dichroic dye F having a rylene structure whose longest-wave absorption maximum is at a wavelength of greater than 600 nm.

The LC device of the guest-host type is explained in greater detail below.

It represents a switchable device which contains a switchable layer comprising the liquid-crystalline medium according to the invention. Switching of the device here is taken to mean a change in the light transmission of the device. This can be utilised for the display of information (display device, display) or for the regulation of the passage of energy through the device, preferably the passage of light (switchable window, energy-saving window).

The LC device of the guest-host type is preferably electrically switchable. However, it may also be thermally switchable, as described, for example, in WO 2010/118422. In this case, the switching preferably takes place through a transition from a nematic state to an isotropic state through a change in the temperature of the switchable layer comprising the liquid-crystalline medium according to the invention. In the nematic state, the molecules of the liquid-crystalline medium are in ordered form, and thus so are the dichroic compounds, for example aligned parallel to the surface of the device due to the action of an alignment layer. In the isotropic state, the molecules are in unordered form, and thus so are the dichroic dyes. The difference between ordered and unordered presence of the dichroic dyes causes a difference in the light transmission of the LC device of the guest-host type, in accordance with the principle explained above that dichroic dye molecules have a higher or lower absorption coefficient depending on the alignment with respect to the plane of vibration of light.

If the device is electrically switchable, it preferably includes two or more electrodes which are attached to both sides of the layer comprising the liquid-crystalline medium. The electrodes are preferably provided with electrical connections. The voltage is preferably provided by a battery, an accumulator or by external power supply.

The switching operation in the case of electrical switching takes place through an alignment of the molecules of the liquid-crystalline medium by the application of voltage.

In a preferred embodiment, the device is converted from a state of high absorption, i.e. low light transmission, which is present without voltage, to a state of lower absorption, i.e. higher light transmission. The liquid-crystalline medium is preferably nematic in both states. The voltage-free state is preferably characterised in that the molecules of the liquid-crystalline medium, and thus the dichroic dyes, are aligned parallel to the surface of the device. This is preferably achieved by a correspondingly selected alignment layer. The state under voltage is preferably characterised in that the molecules of the liquid-crystalline medium, and thus the dichroic dyes, are perpendicular to the surface of the device.

In an alternative embodiment to the embodiment mentioned above, the device is converted from a state of low absorption, i.e. high light transmission, which is present without voltage, to a state of higher absorption, i.e. lower light transmission. The liquid-crystalline medium is preferably nematic in both states. The voltage-free state is preferably characterised in that the molecules of the liquid-crystalline medium, and thus the dichroic dyes, are aligned perpendicular to the surface of the device. This is preferably achieved by a correspondingly selected alignment layer. The state under voltage is preferably characterised in that the molecules of the liquid-crystalline medium, and thus the dichroic dyes, are parallel to the surface of the device.

According to a preferred embodiment of the invention, the LC device of the guest-host type can be operated without external power supply by providing the requisite energy by a solar cell or another device for the conversion of light and/or heat energy into electrical energy. The provision of the energy by the solar cell can take place directly or indirectly, i.e. via an intermediate battery or accumulator or other unit for the storage of energy. The solar cell is preferably mounted externally on the device or it is an internal constituent of the LC device of the guest-host type, as disclosed, for example, in WO 2009/141295. Particular preference is given here to solar cells, which are particularly efficient in the case of diffuse light, and transparent solar cells. Organic solar cells can be used in the devices according to the invention.

The device furthermore preferably comprises one or more, particularly preferably two, alignment layers. The function of the alignment layer and the electrode may coincide in one layer, for example in a polyimide layer. The alignment layers are preferably polyimide layers, particularly preferably layers comprising rubbed polyimide. Rubbed polyimide results in a preferential alignment of the liquid-crystalline compounds in the rubbing direction if the compounds are planar to the alignment layer.

The switchable layer is furthermore preferably arranged between two substrate layers or surrounded thereby in the LC device of the guest-host type. The substrate layers may consist, for example, of glass or a polymer, preferably a light-transmitting polymer.

According to one preferable embodiment, the LC device of the guest-host type contains no polarisers.

According to an alternative preferable embodiment, the LC device of the guest-host type contains one or more polarisers. These are preferably linear polarisers. Preferably, precisely one polariser or precisely two polarisers are present. If one or more polarisers are present, these are preferably arranged parallel to the surface of the device.

If precisely one polariser is present, its absorption direction is preferably perpendicular to the preferential alignment of the liquid-crystalline compounds of the liquid-crystalline medium of the LC device on the side of the polariser.

In the case where precisely two polarisers are present, it is preferred for a so-called dye-doped TN mode to be present. In this case, the preferential alignment of the liquid-crystalline compounds of the liquid-crystalline medium in the LC device on both sides of the layer comprising the medium is twisted with respect to one another, preferably by an angle of about 90°. In this case, the absorption direction of the polarisers is furthermore preferably in each case parallel to the preferential alignment of the liquid-crystalline compounds in the LC device on the side of the respective polariser.

In the LC device of the guest-host type, both absorptive and also reflective polarisers can be employed. Preference is given to the use of polarisers which are in the form of thin optical films. Preference is furthermore given to the use of linear polarisers. Examples of reflective polarisers which can be used in the device according to the invention are DRPF (diffusive reflective polariser film, 3M), DBEF (dual brightness enhanced film, 3M), DBR (layered-polymer distributed Bragg reflectors, as described in U.S. Pat. No. 7,038,745 and U.S. Pat. No. 6,099,758) and APF films (advanced polariser film, 3M, cf. Technical Digest SID 2006, 45.1, US 2011/0043732 and U.S. Pat. No. 7,023,602). It is furthermore possible to employ polarisers based on wire grids (WGPs, wire-grid polarisers) which reflect infrared light. Examples of absorptive polarisers which can be employed in the devices according to the invention are the Itos XP38 polariser film and the Nitto Denko GU-1220DUN polariser film. An example of a circular polariser which can be used in accordance with the invention is the APNCP37-035-STD polariser (American Polarizers). A further example is the CP42 polariser (ITOS).

The LC device of the guest-host type furthermore preferably contains a light-guide system, preferably as described in WO 2009/141295. The light-guide system collects and concentrates light which hits the device. It preferably collects and concentrates light which is emitted by fluorescent dichroic dyes in the switchable layer comprising the liquid-crystalline medium. The light-guide system is in contact with a device for the conversion of light energy into electrical energy, preferably a solar cell, so that the collected light hits this in concentrated form. In a preferred embodiment of the invention, the device for the conversion of light energy into electrical energy is mounted on the edge of the device, integrated therein and electrically connected to the device for the electrical switching of the LC device of the guest-host type.

The LC device of the guest-host type can preferably be used as a display. Specific embodiments of such devices have been described many times in the prior art, cf. B. Bahadur, Liquid Crystals—Applications and Uses, Vol. 3, 1992, World Scientific Publishing, Section 11.

However, it can likewise preferably be used as a device for the regulation of the passage of energy through a light-transmitting area. In this case, the device is preferably designed in its outer structure as described in WO 2009/141295 and WO 2010/118422. Furthermore, it is in this case used primarily for the regulation of the temperature of an interior space, preferably an interior space of a building.

Furthermore, the device can also be employed for aesthetic room design, for example for light and colour effects. For example, door and wall elements comprising the LC device of the guest-host type according to the invention in grey or in colour can be switched to transparent. Furthermore, the device may also contain white or coloured full-area backlighting, which is modulated in luminance, or yellow full-area backlighting, which is modulated in colour by means of a blue guest-host display. Further aesthetic effects can also be generated with the aid of light sources shining in from the side, such as white or coloured LEDs or LED chains in combination with the device according to the invention. In this case, one or both glass sides of the device according to the invention can be provided with roughened or structured glass for the coupling-out of light and/or for the generation of light effects.

According to a preferred embodiment of the invention, the LC device of the guest-host type is a constituent of a window or a similar light-transmitting opening. The window or opening is preferably located in a building. However, it can also be located in the wall of any desired other closed space, for example in a container or a vehicle. Alternative uses of the devices according to the invention are, for example, in doors, as a constituent of interior walls of spaces, for example conference rooms, in room partitions and/or in decorative elements.

WORKING EXAMPLES

The following examples illustrate the present invention and are not to be interpreted as restrictive.

In the present application, structures of liquid-crystalline compounds are reproduced by abbreviations (acronyms). These abbreviations are explicitly presented and explained in WO 2012/052100 (pp. 63-89), so that reference is made to the said published application for an explanation of the abbreviations in the present application.

The following liquid-crystalline media (M-1 to M-13) are prepared by mixing the components indicated. The parameters clearing point, delta-n, $n_e$, $n_o$, the solubility of various dyes, the stability of the solutions and the degree of anisotropy of the dye in the liquid-crystalline medium in question are determined for the mixtures and indicated below.

All physical properties are determined in accordance with "Merck Liquid Crystals, Physical Properties of Liquid Crystals", Status November 1997, Merck KGaA, Germany, and apply for a temperature of 20° C. The value of Δn is determined at 589 nm, and the value of Δ∈ is determined at 1 kHz, unless explicitly stated otherwise in each case. $n_e$ and $n_o$ are in each case the refractive indices of the extraordinary and ordinary light beam under the conditions indicated above.

The degree of anisotropy R is determined from the value for the extinction coefficient E(p) (extinction coefficient of the mixture in the case of parallel alignment of the molecules to the polarisation direction of the light) and the value for the extinction coefficient of the mixture E(s) (extinction coefficient of the mixture in the case of perpendicular alignment of the molecules to the polarisation direction of the light), in each case at the wavelength of the maximum of the absorption band of the dye in question. If the dye has a plurality of absorption bands, the strongest absorption band is selected. The alignment of the molecules of the mixture is achieved by an alignment layer, as known to the person skilled in the art in the area of LC display technology. In order to eliminate influences by liquid-crystalline medium, other absorptions and/or reflections, each measurement is carried out against an identical mixture comprising no dye, and the value obtained is subtracted.

The measurement is carried out using linear-polarised light whose vibration direction is either parallel to the alignment direction (determination of E(p)) or perpendicular to the alignment direction (determination of E(s)). This can be achieved by a linear polariser, where the polariser is rotated with respect to the device in order to achieve the two different vibration directions. The measurement of E(p) and E(s) is thus carried out via the rotation of the vibration direction of the incident polarised light.

The degree of anisotropy R is calculated from the resultant values for E(s) and E(p) in accordance with the formula $$R=[E(p)-E(s)]/[E(p)+_2*E(s)],$$

as indicated, inter alia, in "Polarized Light in Optics and Spectroscopy", D. S. Kliger et al., Academic Press, 1990. A detailed description of the method for the determination of the degree of anisotropy of liquid-crystalline media comprising a dichroic dye is also given in B. Bahadur, Liquid Crystals—Applications and Uses, Vol. 3, 1992, World Scientific Publishing, Section 11.4.2.

A) Mixtures Used

The liquid-crystalline media M-1 to M-13 shown below are mixed with the rylene dyes according to the invention. Good solubility and high stability of the mixtures are apparent here.

|  | M-1 | M-2 |
|---|---|---|
| Clearing point | 114.5° C. | 113° C. |
| Delta-n | 0.1342 | 0.1393 |
| $n_e$ | 1.6293 | 1.6345 |
| $n_o$ | 1.4951 | 1.4952 |

| Composition | Compound | % | Compound | % |
|---|---|---|---|---|
|  | CPG-3-F | 5 | CPG-3-F | 5 |
|  | CPG-5-F | 5 | CPG-5-F | 5 |
|  | CPU-3-F | 15 | CPU-3-F | 12 |
|  | CPU-S-F | 15 | CPU-S-F | 12 |
|  | CP-3-N | 16 | CP-3-N | 16 |
|  | CP-5-N | 16 | CP-5-N | 16 |
|  | CCGU-3-F | 7 | CCGU-3-F | 7 |
|  | CGPC-3-3 | 4 | CPGU-3--OT | 4 |
|  | CGPC-5-3 | 4 | CCZPC-3-3 | 4 |
|  | CGPC-5-5 | 4 | CCZPC-3-4 | 4 |
|  | CCZPC-3-3 | 3 | CCZPC-3-5 | 3 |
|  | CCZPC-3-4 | 3 | CPZG-3-N | 4 |
|  | CCZPC-3-5 | 3 | CPZG-4-N | 4 |
|  |  |  | CPZG-5-N | 4 |

|  | M-3 | M-4 |
|---|---|---|
| Clearing point | 110° C. | 115.5° C. |
| Delta-n | 0.1234 | not measured |
| $n_e$ | 1.6150 | not measured |
| $n_o$ | 1.4916 | not measured |

| Composition | Compound | % | Compound | % |
|---|---|---|---|---|
|  | CP-3-N | 18 | CPG-2-F | 3 |
|  | CP-4-N | 12 | CPG-3-F | 4 |
|  | CP-5-N | 21 | CPG-5-F | 4 |
|  | CP-3-O1 | 13 | CPU-3-F | 4 |
|  | CPPC-3-3 | 3 | CPU-5-F | 4 |
|  | CPPC-5-3 | 3 | CCU-2-F | 4 |
|  | CPPC-5-5 | 3 | CCU-3-F | 4 |
|  | CGPC-3-3 | 3 | CCU-S-F | 4 |
|  | CGPC-5-3 | 3 | CCGU-3-F | 5 |
|  | CGPC-5-5 | 3 | CP-3-O1 | 12 |
|  | CCZGI-3-3 | 4 | CP-3-O2 | 18 |
|  | CCZGI-3-5 | 5 | CGPC-3-3 | 3 |
|  | CCZPC-3-3 | 3 | CGPC-5-3 | 3 |
|  | CCZPC-3-4 | 3 | CGPC-5-5 | 3 |
|  | CCZPC-3-5 | 3 | CCZPC-3-3 | 3 |
|  |  |  | CCZPC-3-4 | 3 |
|  |  |  | CCZPC-3-5 | 3 |
|  |  |  | CCP-2-OT | 4 |
|  |  |  | CCP-3-OT | 4 |
|  |  |  | CCP-4-OT | 4 |
|  |  |  | CCP-5-OT | 4 |

|  | M-5 | M-6 |
|---|---|---|
| Clearing point | 110.5° C. | 110.0° C. |
| Low-temperature stability (in days) | 37 | 45 |

| Composition | Compound | % | Compound | % |
|---|---|---|---|---|
|  | CPU-3-F | 20 | CPU-3-F | 20 |
|  | CPU-5-F | 20 | CPU-5-F | 20 |
|  | CP-3-N | 16 | CCU-3-F | 5 |
|  | CP-5-N | 16 | CP-3-N | 16 |
|  | CCGU-3-F | 7 | CP-5-N | 15 |
|  | CGPC-3-3 | 4 | CGPC-3-3 | 4 |
|  | CGPC-5-3 | 4 | CGPC-5-3 | 4 |
|  | CGPC-5-5 | 4 | CGPC-5-5 | 4 |

|  |  |  |  |
|---|---|---|---|
| CCZPC-3-3 | 3 | CCZPC-3-3 | 4 |
| CCZPC-3-4 | 3 | CCZPC-3-4 | 3 |
| CCZPC-3-5 | 3 | CCZPC-3-5 | 3 |
|  |  | CPPC-3-3 | 2 |

|  | M-7 | M-8 |
|---|---|---|
| Clearing point | 109.0° C. | 112.0° C. |
| Low-temperature stability (in days) | 40 | 39 |

| Composition | Compound | % | Compound | % |
|---|---|---|---|---|
|  | CPU-3-F | 8 | CPU-2-F | 6 |
|  | CPU-5-F | 20 | CPU-3-F | 8 |
|  | CCU-3-F | 8 | CPU-5-F | 15 |
|  | CCG-V-F | 11 | CPU-7-F | 17 |
|  | CP-3-N | 16 | CP-3-N | 14 |
|  | CP-5-N | 15 | CP-5-N | 15 |
|  | CGPC-3-3 | 4 | CGPC-3-3 | 4 |
|  | CGPC-5-3 | 4 | CGPC-5-3 | 4 |
|  | CGPC-5-5 | 4 | CGPC-5-5 | 4 |
|  | CCZPC-3-3 | 4 | CCZPC-3-3 | 4 |
|  | CCZPC-3-4 | 3 | CCZPC-3-4 | 4 |
|  | CCZPC-3-5 | 3 | CCZPC-3-5 | 4 |
|  |  |  | CPPC-3-3 | 1 |

|  | M-9 | M-10 |
|---|---|---|
| Clearing point | 116.0° C. | 112.0° C. |
| Low-temperature stability (in days) | 55 | 36 |

| Composition | Compound | % | Compound | % |
|---|---|---|---|---|
|  | CPU-5-F | 15 | CPU-3-F | 15 |
|  | CPU-7-F | 17 | CPU-5-F | 15 |
|  | CP-3-N | 18 | CP-3-N | 13 |
|  | CP-5-N | 15 | CP-5-N | 12 |
|  | CP-1V-N | 7 | CP-1V-N | 5 |
|  | CGPC-3-3 | 4 | CG-3-N | 5 |
|  | CGPC-5-3 | 4 | CU-3-N | 5 |
|  | CGPC-5-5 | 4 | CGPC-3-3 | 4 |
|  | CCZPC-3-3 | 3 | CGPC-5-3 | 4 |
|  | CCZPC-3-4 | 3 | CGPC-5-5 | 4 |
|  | CCZPC-3-5 | 2 | CCZPC-3-3 | 3 |
|  | CPPC-3-3 | 2 | CCZPC-3-4 | 3 |
|  | CPGP-4-3 | 3 | CCZPC-3-5 | 2 |
|  | CPGP-5-2 | 3 | CPPC-3-3 | 4 |
|  |  |  | CPGP-4-3 | 3 |
|  |  |  | CPGP-5-2 | 3 |

|  | M-11 | M-12 |
|---|---|---|
| Clearing point | 111.0° C. | 110.0° C. |
| Low-temperature stability (in days) | 45 | 57 |

| Composition | Compound | % | Compound | % |
|---|---|---|---|---|
|  | CPU-3-F | 10 | CPU-3-F | 10 |
|  | CPU-5-F | 13 | CPU-5-F | 13 |
|  | CPG-3-F | 5 | CPG-3-F | 5 |
|  | CPG-5-F | 7 | CPG-5-F | 7 |
|  | CP-3-N | 13 | CP-3-N | 15 |
|  | CP-5-N | 12 | CP-1V-N | 9 |
|  | CP-1V-N | 9 | CP-V2-N | 10 |
|  | CG-3-N | 5 | CG-1V-N | 5 |
|  | CGPC-3-3 | 4 | CGPC-3-3 | 4 |
|  | CGPC-5-3 | 4 | CGPC-5-3 | 4 |
|  | CGPC-5-5 | 4 | CGPC-5-5 | 4 |
|  | CCZPC-3-3 | 4 | CCZPC-3-3 | 4 |
|  | CPPC-3-3 | 4 | CPPC-3-3 | 4 |
|  | CPPC-3-3 | 4 | CPPC-3-3 | 4 |
|  | CPGP-4-3 | 3 | CPGP-4-3 | 3 |
|  | CPGP-5-2 | 3 | CPGP-5-2 | 3 |

|  | M-13 |
|---|---|
| Clearing point | 113.0° C. |
| Low-temperature stability (in days) | 67 |

| Composition | Compound | % |
|---|---|---|
|  | CPU-3-F | 12 |
|  | CPU-5-F | 15 |
|  | CPG-3-F | 3 |
|  | CPG-5-F | 5 |
|  | CP-3-N | 15 |
|  | CP-5-N | 10 |
|  | CP-1V-N | 6 |
|  | CGPC-3-3 | 4 |
|  | CGPC-5-3 | 3 |
|  | CGPC-5-5 | 3 |
|  | CPPC-3-3 | 4 |
|  | CPZIC-3-4 | 8 |
|  | CCZP-3-3 | 5 |
|  | CPZP-3-3 | 5 |
|  | CCZGI-3-3 | 2 |

B) Dichroic Dyes Used

The following dyes are prepared by known processes or purchased commercially:

For the dyes, the absorption maximum, the degree of anisotropy R and the solubility in liquid-crystalline medium M-1 are determined.

| Name | Absorption maximum/nm | Colour | Degree of anisotropy R | Solubility in % by weight in M-1 |
|---|---|---|---|---|
| D-1 | 472 | Yellow | 0.50 | 0.25 |
| D-2 | 477 | Yellow | 0.77 | 0.50 |
| D-3 | 472 | Yellow | 0.62 | 0.40 |
| D-4 | 580 | Red | 0.08 | 0.15 |
| D-5 | 529 | Red | 0.60 | 0.15 |
| D-7 | 522 | Red | 0.54 | 0.25 |
| D-8 | 524 | Red | 0.75 | 0.25 |
| D-9 | 523 | Red | 0.69 | 0.25 |
| D-10 | 523 | Red | 0.76 | 0.15 |
| D-11 | 590 | Red-violet | 0.68 | 0.50 |
| D-12 | 655 | Blue | 0.76 | 0.70 |
| D-13 | 610 | Blue | 0.76 | 0.50 |
| D-14 | 624 | Blue | 0.81 | 0.30 |
| D-15 | 745 | NIR absorb. | 0.80 | 0.20 |
| D-16 | 835 | NIR absorb. | 0.83 | 0.20 |
| D-17 | 925 | NIR absorb. | 0.81 | 0.20 |
| D-18 | 1015 | NIR absorb. | 0.83 | 0.20 |
| D-19 | 1105 | NIR absorb. | 0.82 | 0.20 |
| D-21 | 570 | Red-violet | 0.59 | 0.13 |

Structures of the Dyes:
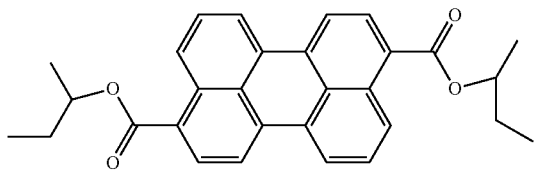
D-1
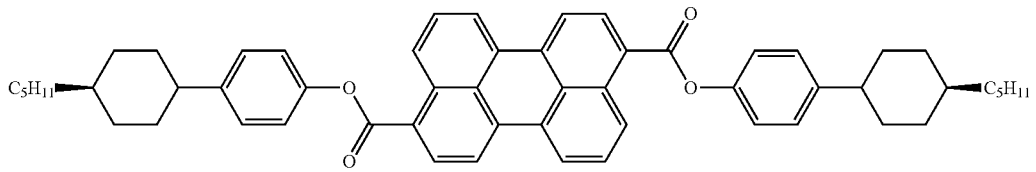
D-2
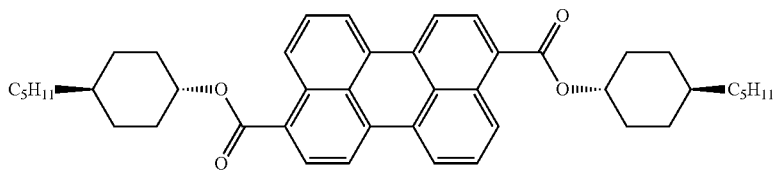
D-3
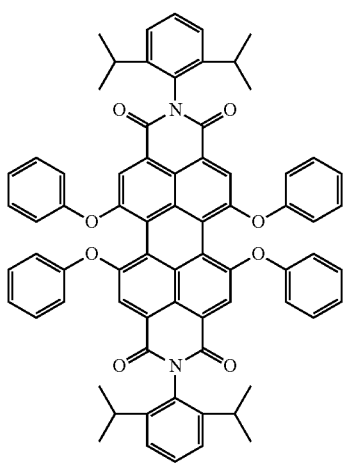
D-4
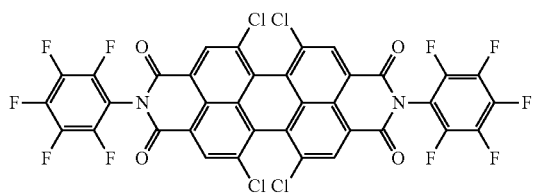
D-5
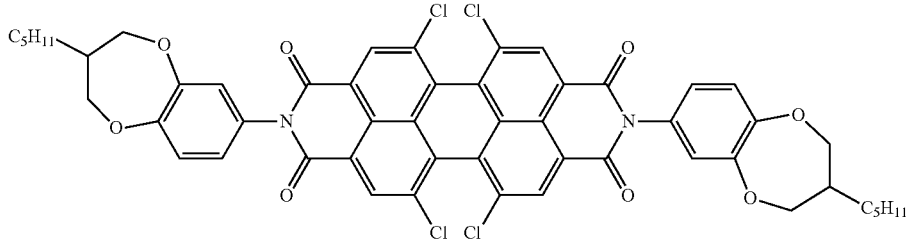
D-6
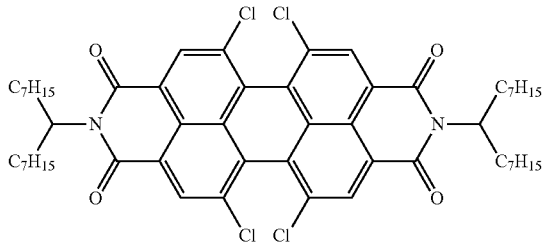
D-7

-continued
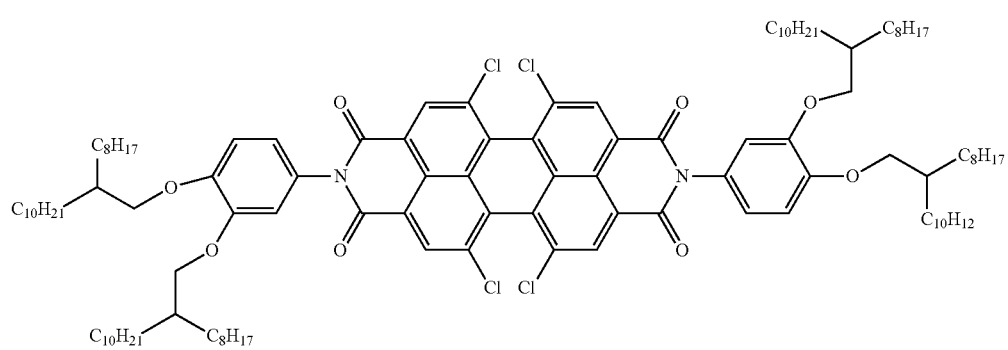
D-8
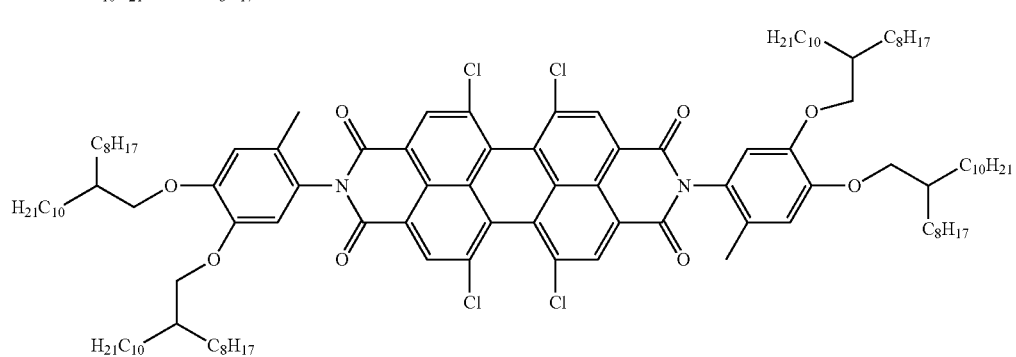
D-9
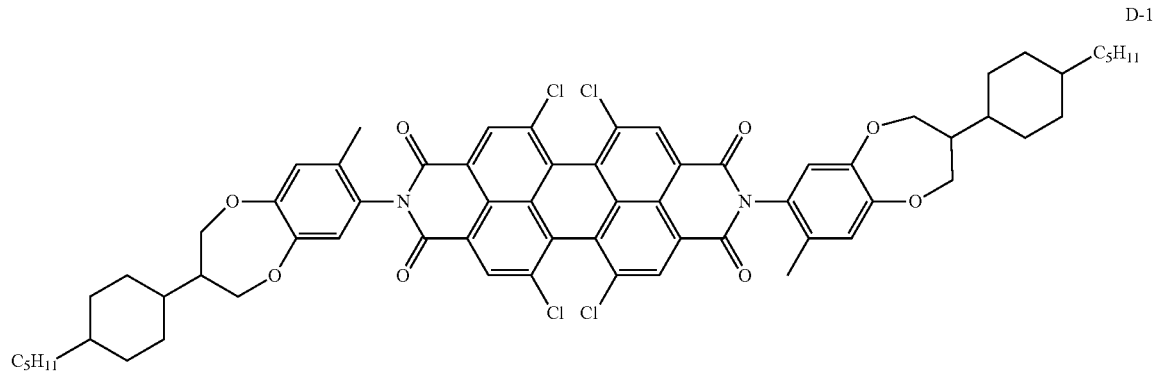
D-10
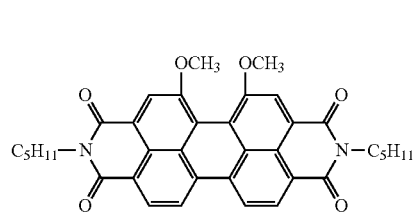
D-11
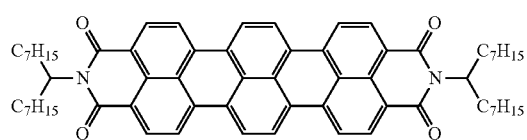
D-12
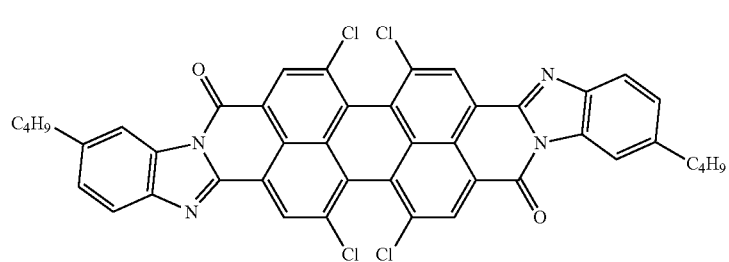
D-13

-continued
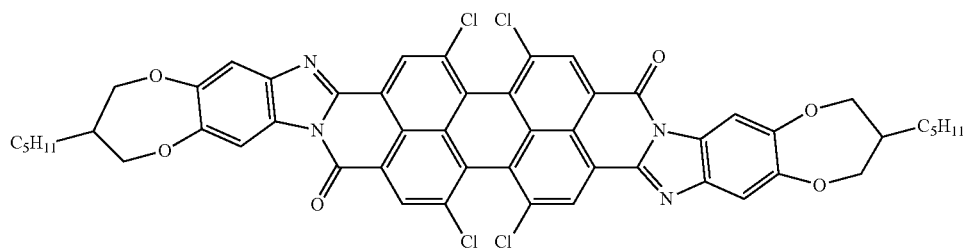
D-14
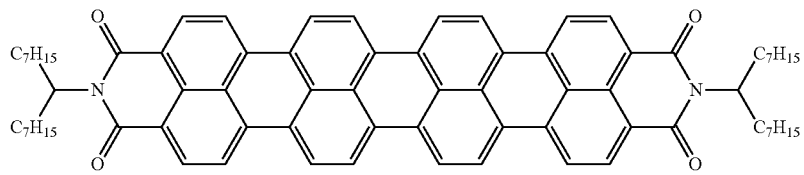
D-15
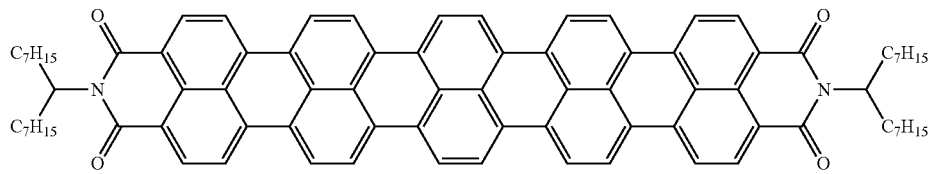
D-16
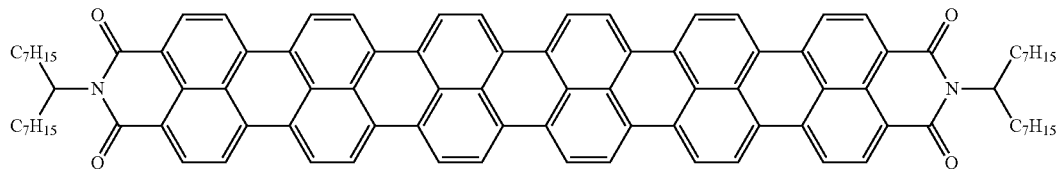
D-17
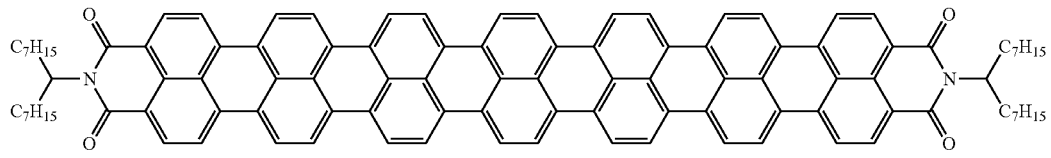
D-18
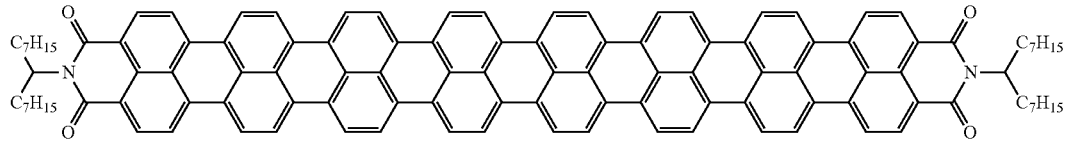
D-19
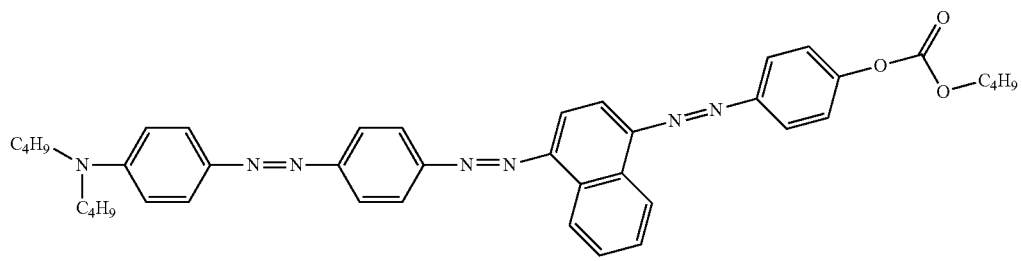
D-20
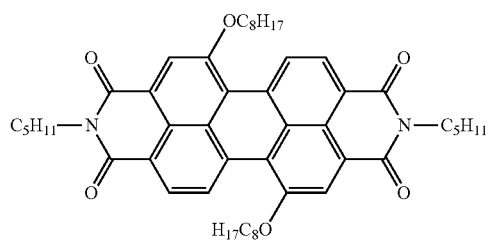
D-21

C) Preparation of Mixtures Comprising a Plurality of Dichroic Dyes and Use in LC Devices of the Guest-Host Type For the preparation of the mixtures according to the invention, in all cases the mixture of two, three or four different dichroic dyes indicated in the respective cases is added to liquid-crystalline medium M-1 (cf. table above).

The liquid-crystal mixture is introduced into a display. The liquid-crystal layer in this arrangement has a planar alignment with an antiparallel pretilt angle. This alignment is achieved by two polyimide layers rubbed antiparallel to one another which, considered in the lying display, are located above and below the liquid-crystal layer. The polyimide alignment layer is followed, in the viewing direction, on the outside by an electrically conductive transparent layer of indium tin oxide (ITO). The thickness of the liquid-crystal layer is controlled by spacers. The displays used have a layer thickness, depending on the choice of spacer, in the region of 20, 25 or 50 microns. Other layer thicknesses are possible through the choice of corresponding spacers.

The measurement is carried out with the guest-host cell in the measurement beam and a cell of identical design containing the host in the reference beam. This eliminates reflection and absorption losses of the cell.

Values for the degree of light transmission $\tau_v$ and the direct degree of radiation transmission $\tau_e$ are determined for both the dark and bright switching state of the device and are shown below. Furthermore, the colour location of the device in the dark and bright state is determined, and the values are indicated in CIE coordinates.

The values $\tau_e$ and $\tau_v$ and the CIE coordinates are defined as follows:
$\tau_v$=degree of light transmission in accordance with DIN EN410
$\tau_e$=direct degree of radiation transmission in accordance with DIN EN410 (solar direct transmittance)

The colour location (for white, grey black) of standard illuminant D65 forming the basis here is at x=0.3127 and y=0.3290 (Manfred Richter, Einführung in die Farbmetrik [Introduction to Colorimetry], second edition 1991, ISBN 3-11-008209-8). The colour locations indicated (x,y) all relate to standard illuminant D65 and a 2° standard observer in accordance with CIE 1931.

All examples show good stability of the liquid-crystalline media according to the invention and adequate solubility of the dyes in the liquid-crystalline media. The devices according to the invention can be switched from a dark state having significantly reduced light transmission to a bright state having significantly increased light transmission.

1) Example Device B-1

Dyes: 0.26% of D-2, 0.43% of D-3, 0.63% of D-11
Dark switching state: colour grey. Layer thickness 25 microns
Colour location x=0.308, y=0.327;
$\tau_v$=34%, $\tau_e$=70%
Bright switching state: colour grey. Layer thickness 25 microns
Colour location x=0.316, y=0.336;
$\tau_v$=60%, $\tau_e$=80%

2) Example Device B-2

Dyes: 0.44% of D-2, 0.33% of D-3, 0.22% of D-11, 0.17% of D-20
Dark switching state: colour grey. Layer thickness 25 microns
Colour location x=0.311, y=0.325;
$\tau_v$=34%, $\tau_e$=69%
Bright switching state: colour grey. Layer thickness 25 microns
Colour location x=0.317, y=0.335;
$\tau_v$=63%, $\tau_e$=82%

3) Example Device B-3

Dyes: 0.34% of D-13, 0.43% of D-3, 0.44% of D-11
Dark switching state: colour grey. Layer thickness 25 microns
Colour location x=0.313, y=0.328;
$\tau_v$=35%, $\tau_e$=71%
Bright switching state: colour grey. Layer thickness 25 microns
Colour location x=0.316, y=0.340;
$\tau_v$=61%, $\tau_e$=81%

4) Example Device B-4

Dyes: 0.34% of D-13, 0.43% of D-3, 0.44% of D-11
Dark switching state: colour grey. Layer thickness 25 microns
Colour location x=0.313, y=0.328;
$\tau_v$=35%, $\tau_e$=71%
Bright switching state: colour grey. Layer thickness 25 microns
Colour location x=0.316, y=0.340;
$\tau_v$=61%, $\tau_e$=81%

5) Example Device B-5

Dyes: 0.40% of D-14, 0.42% of D-3, 0.60% of D-11
Dark switching state: colour grey. Layer thickness 25 microns
Colour location x=0.31, y=0.329;
$\tau_v$=34%, $\tau_e$=68%
Bright switching state: colour grey. Layer thickness 25 microns
Colour location x=0.318, y=0.341;
$\tau_v$=61%, $\tau_e$=79%

6) Example Device B-6

Dyes: 0.40% of D-14, 0.42% of D-3, 0.60% of D-11
Dark switching state: colour grey. Layer thickness 25 microns
Colour location x=0.313, y=0.326;
$\tau_v$=35%, $\tau_e$=67%
Bright switching state: colour grey. Layer thickness 25 microns
Colour location x=0.320, y=0.336;
$\tau_v$=63%, $\tau_e$=78%

7) Example Device B-7

Dyes: 0.40% of D-2, 0.15% of D-11
Dark switching state: colour blue. Layer thickness 50 microns
Colour location x=0.247, y=0.246;
$\tau_v$=38%, $\tau_e$=74%

Bright switching state: colour blue. Layer thickness 50 microns
Colour location x=0.286, y=0.305;
$\tau_v$=64%, $\tau_e$=84%

In this example (B-7), only two different dichroic dyes are present in the mixture. The mixture is therefore not grey or black, but instead blue. Although the CIE coordinates change significantly on switching, the colour type, however, remains constant at colour type 17.

8) Example Device B-8

Dyes: 0.45% of D-3, 0.5% of D-11, 0.25% of D-2, 0.08% of D-15, 0.20% of D-16, 0.20% of D-17
Dark switching state: colour grey. Layer thickness 20 microns, antiparallel or TN arrangement
Colour location x=0.304, y=0.327;
$\tau_v$=33%, $\tau_e$=54%
Bright switching state: colour grey. Layer thickness 20 microns, antiparallel or TN arrangement
Colour location x=0.312, y=0.329;
$\tau_v$=53%, $\tau_e$=69%

This example (B-8) shows that use of higher rylenes, such as quaterrylenes, pentarylenes and hexarylenes, can significantly reduce the direct degree of radiation transmission—in the present example to $\tau_e$=54%.

The invention claimed is:
1. A liquid-crystalline medium comprising
at least one dichroic dye F having a rylene structure whose longest-wave absorption maximum is at a wavelength of greater than 600 nm, and which is selected from the group consisting of compounds of formulae (F-I), (F-II), (F-III), (F-IV) and (F-V),

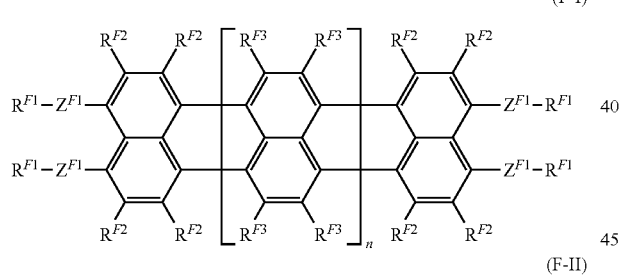

(F-I)

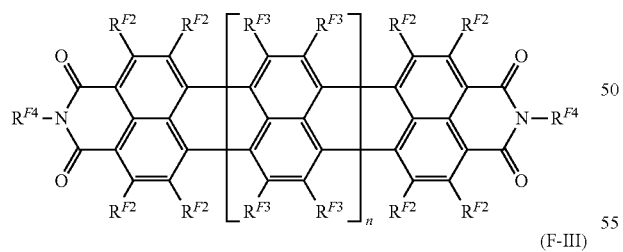

(F-II)

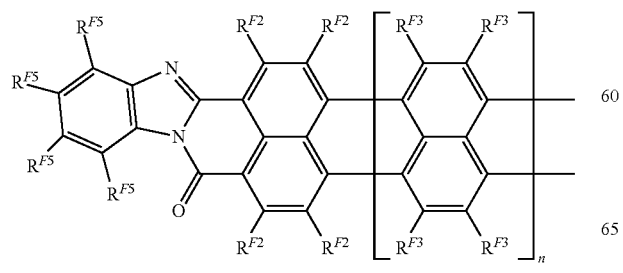

(F-III)

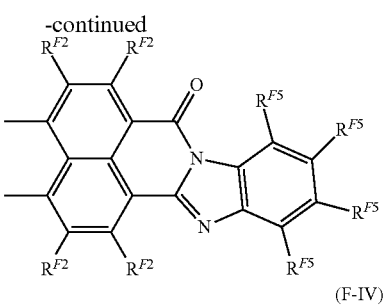

(F-IV)

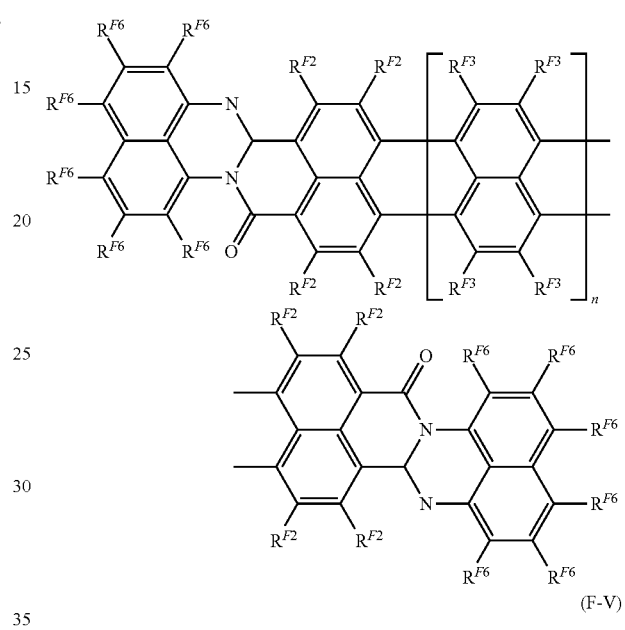

(F-V)

wherein
n is 1, 2, 3, 4, 5, 6, 7 or 8,
$Z^{F1}$ is, each independently, a single bond, —C(=O)O—, —OC(=O)—, —C(=O)S—, —SC(=O)—, —CF$_2$—, —CF$_2$—CF$_2$—, —CF$_2$O—, —OCF$_2$— or —O—,
$R^{F1}$ is, each independently, an alkyl or alkoxy group having 1 to 10 C atoms, or an alkenyl or alkynyl group having 2 to 10 C atoms, or a cycloalkyl group having 3 to 10 C atoms, which are optionally substituted by one or more radicals $R^{F4}$, or an aryl or heteroaryl group having 6 to 30 aromatic ring atoms, which are optionally substituted by one or more radicals $R^{F4}$, $R^{F2}$, $R^{F3}$, $R^{F4}$, $R^{F5}$, $R^{F6}$ are each independently, H, F, Cl, Br, $OR^{FA}$, $OCH_2R^{FA}$, $SR^{FA}$, $SCH_2R^{FA}$, $C(=O)OR^{FA}$, an alkyl or alkoxy group having 1 to 10 C atoms, or an alkenyl or alkynyl group having 2 to 10 C atoms, or a cycloalkyl group having 3 to 10 C atoms, which are optionally substituted by one or more radicals $R^{FA}$, or an aryl or heteroaryl group having 6 to 30 aromatic ring atoms, which are optionally substituted by one or more radicals $R^{FA}$, or an aralkyl or heteroaralkyl group having 6 to 30 aromatic ring atoms, which are optionally substituted by one or more radicals $R^{FA}$, or an aryloxy or heteroaryloxy group having 6 to 30 aromatic ring atoms, which are optionally substituted by one or more radicals $R^{FA}$, $R^{FA}$ is, each independently, F, Cl, Br, $-OCF_2R^{FB}$, $-CF_2O-R^{FB}$, an alkyl or alkoxy group having 1 to 10 C atoms, or an alkenyl or alkynyl group having 2 to 10 C atoms, or a cycloalkyl group having 3 to 10 C atoms, where the said groups are optionally substituted by one or more radicals $R^{FB}$, or an aryl or heteroaryl group having 6 to 30 aromatic ring atoms, which are optionally substituted by one or more radicals $R^{FB}$, and $R^{FB}$ is, each independently, F or an aliphatic, aromatic or heteroaromatic organic radical having 1 to 20 C atoms;

and one or more compounds of formula (I)

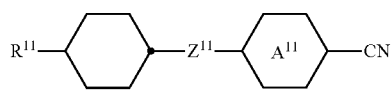
(I)

wherein $R^{11}$ is H, F, Cl, CN, NCS, $R^1-O-CO-$, $R^1-CO-O-$, an alkyl, alkoxy or thioalkoxy group having 1 to 10 C atoms, or an alkenyl, alkenyloxy or thioalkenyloxy group having 2 to 10 C atoms, in which one or more H atoms in the above-mentioned groups are optionally replaced by F, Cl or CN, and in which one or more $CH_2$ groups in the above-mentioned groups are optionally replaced by O, S, $-O-CO-$ or $-CO-O-$, $R^1$ is an alkyl group having 1 to 10 C atoms, in which one or more hydrogen atoms are optionally replaced by F or Cl, and in which one or more $CH_2$ groups are optionally replaced by O or S, $Z^{11}$ is $-CO-O-$, $-O-CO-$, $-CF_2-CF_2-$, $-CF_2-O-$, $-O-CF_2-$, $-CH_2-CH_2-$, $-CH=CH-$, $-CF=CF-$, $-CF=CH-$, $-CH=CF-$, $-C\equiv C-$, $-OCH_2-$, $-CH_2O-$ or a single bond, $A^{11}$ is

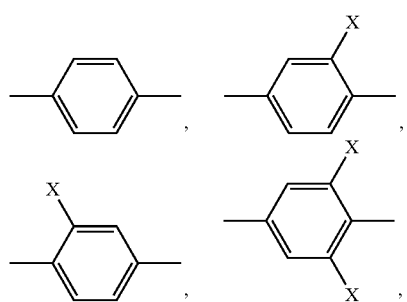

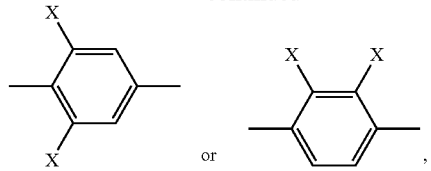

and

X is, each independently, F, Cl, CN or an alkyl, alkoxy or alkylthio group having 1 to 10 C atoms, in which one or more hydrogen atoms in the above-mentioned groups are optionally replaced by F or Cl, and in which one or more $CH_2$ groups in the above-mentioned groups are optionally replaced by O or S.

2. The liquid-crystalline medium according to claim 1, wherein the degree of anisotropy R of the dye F is greater than 0.4.

3. The liquid-crystalline medium according to claim 1, wherein the dichroic dye F absorbs predominantly light in the wavelength range from 600 to 2000 nm.

4. The liquid-crystalline medium according to claim 1, wherein the dichroic dye F is present in a concentration of 0.1% by weight to 10% by weight.

5. The liquid-crystalline medium according to claim 1, wherein the dichroic dye F is a fluorescent dye.

6. The liquid-crystalline medium according to claim 1, wherein the dichroic dye F contains a single rylene chromophore, which is the only rylene chromophore in the dichroic dye F.

7. The liquid-crystalline medium according to claim 1, wherein the dichroic dye F contains a single chromophore, which is the only a chromophore in the dichroic dye F.

8. The liquid-crystalline medium according to claim 1, which, besides the dichroic dye F, comprises two or three further dichroic dyes, where at least one of the two or three further dichroic dyes absorbs green to yellow light and at least one other of the two or three further dichroic dyes absorbs blue light.

9. The liquid-crystalline medium according to claim 1, which, in addition to the dichroic dye F, comprises one or more further dichroic dyes which are selected from the group consisting of azo compounds, anthraquinones, methine compounds, azomethine compounds, merocyanine compounds, naphthoquinones, tetrazines, perylenes, terrylenes, quaterrylenes, higher rylenes and pyrromethenes.

10. The liquid-crystalline medium according to claim 1, which comprises exclusively dichroic dyes which are rylene dyes selected from the group consisting of compounds of formulae (F-I), (F-II), (F-III), (F-IV) and (F-V).

11. The liquid-crystalline medium according to claim 1, which has a dielectric anisotropy of greater than 3.

12. A process for preparing the liquid-crystalline medium according to claim 1, comprising first mixing the one or more compounds of formula (I) with one of more further compounds suitable for forming a liquid crystalline medium without the dichroic dye, and subsequently adding the dichroic dye to said liquid-crystalline medium and dissolving the dichroic dye therein.

13. An electrically switchable LC device of the guest-host type, containing at least one liquid-crystalline medium according to claim 1 in a switching layer.

14. The liquid-crystalline medium according to claim 1, wherein the dichroic dye F is a compound of formula (F-I)

(F-I)

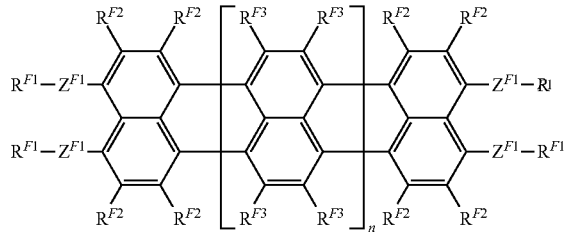

wherein
n is 1, 2, 3, 4, 5, 6, 7 or 8;
$Z^{F1}$ is, each independently, a single bond, —C(=O)O—, —OC(=O)—, —C(=O)S—, —SC(=O)—, —CF$_2$—, —CF$_2$—CF$_2$—, —CF$_2$O—, —OCF$_2$— or —O—;
$R^{F1}$ is, each independently, an alkyl or alkoxy group having 1 to 10 C atoms, or an alkenyl or alkynyl group having 2 to 10 C atoms, or a cycloalkyl group having 3 to 10 C atoms, which are optionally substituted by one or more radicals $R^{FA}$, or an aryl or heteroaryl group having 6 to 30 aromatic ring atoms, which are optionally substituted by one or more radicals $R^{FA}$;
$R^{F2}$, $R^{F3}$ are each independently, H, F, Cl, Br, $OR^{FA}$, $OCH_2R^{FA}$, $SR^{FA}$, $SCH_2R^{FA}$, $C(=O)OR^{FA}$, an alkyl or alkoxy group having 1 to 10 C atoms, or an alkenyl or alkynyl group having 2 to 10 C atoms, or a cycloalkyl group having 3 to 10 C atoms, which are optionally substituted by one or more radicals $R^{FA}$, or an aryl or heteroaryl group having 6 to 30 aromatic ring atoms, which are optionally substituted by one or more radicals $R^{FA}$, or an aralkyl or heteroaralkyl group having 6 to 30 aromatic ring atoms, which are optionally substituted by one or more radicals $R^{FA}$, or an aryloxy or heteroaryloxy group having 6 to 30 aromatic ring atoms, which are optionally substituted by one or more radicals $R^{FA}$;
$R^{FA}$ is, each independently, F, Cl, Br, —OCF$_2$R$^{FB}$, —CF$_2$O—R$^{FB}$, an alkyl or alkoxy group having 1 to 10 C atoms, or an alkenyl or alkynyl group having 2 to 10 C atoms, or a cycloalkyl group having 3 to 10 C atoms, where the said groups are optionally substituted by one or more radicals $R^{FB}$, or an aryl or heteroaryl group having 6 to 30 aromatic ring atoms, which are optionally substituted by one or more radicals $R^{FB}$; and
$R^{FB}$ is, each independently, F or an aliphatic, aromatic or heteroaromatic organic radical having 1 to 20 C atoms.

15. The liquid-crystalline medium according to claim 1, wherein the dichroic dye F is a compound of formula (F-II)

(F-II)

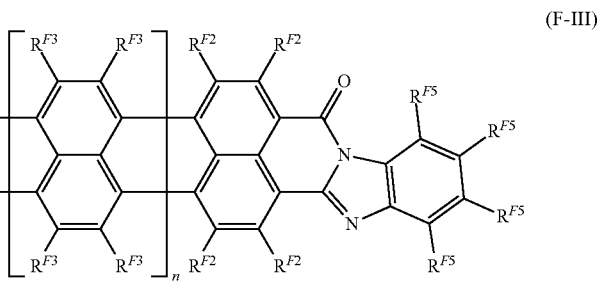

wherein
n is 1, 2, 3, 4, 5, 6, 7 or 8;
$R^{F2}$, $R^{F3}$, $R^{F4}$ are each independently, H, F, Cl, Br, $OR^{FA}$, $OCH_2R^{FA}$, $SR^{FA}$, $SCH_2R^{FA}$, $C(=O)OR^{FA}$, an alkyl or alkoxy group having 1 to 10 C atoms, or an alkenyl or alkynyl group having 2 to 10 C atoms, or a cycloalkyl group having 3 to 10 C atoms, which are optionally substituted by one or more radicals $R^{FA}$, or an aryl or heteroaryl group having 6 to 30 aromatic ring atoms, which are optionally substituted by one or more radicals $R^{FA}$, or an aralkyl or heteroaralkyl group having 6 to 30 aromatic ring atoms, which are optionally substituted by one or more radicals $R^{FA}$, or an aryloxy or heteroaryloxy group having 6 to 30 aromatic ring atoms, which are optionally substituted by one or more radicals $R^{FA}$;
$R^{FA}$ is, each independently, F, Cl, Br, —OCF$_2$R$^{FB}$, —CF$_2$O—R$^{FB}$, an alkyl or alkoxy group having 1 to 10 C atoms, or an alkenyl or alkynyl group having 2 to 10 C atoms, or a cycloalkyl group having 3 to 10 C atoms, where the said groups are optionally substituted by one or more radicals $R^{FB}$, or an aryl or heteroaryl group having 6 to 30 aromatic ring atoms, which are optionally substituted by one or more radicals $R^{FB}$; and
$R^{FB}$ is, each independently, F or an aliphatic, aromatic or heteroaromatic organic radical having 1 to 20 C atoms.

16. The liquid-crystalline medium according to claim 1, wherein the dichroic dye F is a compound of formula (F-III)

(F-III)

wherein
n is 1, 2, 3, 4, 5, 6, 7 or 8;
$R^{F2}$, $R^{F3}$, $R^{F5}$ are each independently, H, F, Cl, Br, $OR^{FA}$, $OCH_2R^{FA}$, $SR^{FA}$, $SCH_2R^{FA}$, $C(=O)OR^{FA}$, an alkyl or alkoxy group having 1 to 10 C atoms, or an alkenyl or alkynyl group having 2 to 10 C atoms, or a cycloalkyl group having 3 to 10 C atoms, which are optionally substituted by one or more radicals $R^{FA}$, or an aryl or heteroaryl group having 6 to 30 aromatic ring atoms, which are optionally substituted by one or more radicals $R^{FA}$, or an aralkyl or heteroaralkyl group having 6 to 30 aromatic ring atoms, which are optionally substituted by one or more radicals $R^{FA}$, or an aryloxy or heteroaryloxy group having 6 to 30 aromatic ring atoms, which are optionally substituted by one or more radicals $R^{FA}$;

$R^{FA}$ is, each independently, F, Cl, Br, —OCF$_2$R$^{FB}$, —CF$_2$O—R$^{FB}$, an alkyl or alkoxy group having 1 to 10 C atoms, or an alkenyl or alkynyl group having 2 to 10 C atoms, or a cycloalkyl group having 3 to 10 C atoms, where the said groups are optionally substituted by one or more radicals $R^{FB}$, or an aryl or heteroaryl group having 6 to 30 aromatic ring atoms, which are optionally substituted by one or more radicals $R^{FB}$; and $R^{FB}$ is, each independently, F or an aliphatic, aromatic or heteroaromatic organic radical having 1 to 20 C atoms.

17. The liquid-crystalline medium according to claim 1, wherein the dichroic dye F is a compound of formula (F-IV)

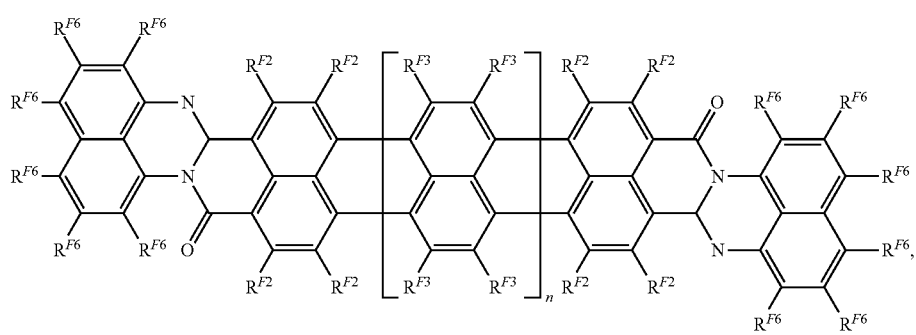

(F-IV)

wherein
n is 1, 2, 3, 4, 5, 6, 7 or 8;
$R^{F2}$, $R^{F3}$, $R^{F6}$ are each independently, H, F, Cl, Br, OR$^{FA}$, OCH$_2$R$^{FA}$, SR$^{FA}$, SCH$_2$R$^{FA}$, C(=O)OR$^{FA}$, an alkyl or alkoxy group having 1 to 10 C atoms, or an alkenyl or alkynyl group having 2 to 10 C atoms, or a cycloalkyl group having 3 to 10 C atoms, which are optionally substituted by one or more radicals $R^{FA}$, or an aryl or heteroaryl group having 6 to 30 aromatic ring atoms, which are optionally substituted by one or more radicals $R^{FA}$, or an aralkyl or heteroaralkyl group having 6 to 30 aromatic ring atoms, which are optionally substituted by one or more radicals $R^{FA}$, or an aryloxy or heteroaryloxy group having 6 to 30 aromatic ring atoms, which are optionally substituted by one or more radicals $R^{FA}$;

$R^{FA}$ is, each independently, F, Cl, Br, —OCF$_2$R$^{FB}$, —CF$_2$O—R$^{FB}$, an alkyl or alkoxy group having 1 to 10 C atoms, or an alkenyl or alkynyl group having 2 to 10 C atoms, or a cycloalkyl group having 3 to 10 C atoms, where the said groups are optionally substituted by one or more radicals $R^{FB}$, or an aryl or heteroaryl group having 6 to 30 aromatic ring atoms, which are optionally substituted by one or more radicals $R^{FB}$; and $R^{FB}$ is, each independently, F or an aliphatic, aromatic or heteroaromatic organic radical having 1 to 20 C atoms.

18. The liquid-crystalline medium according to claim 1, wherein the dichroic dye F is a compound of formula (F-V)

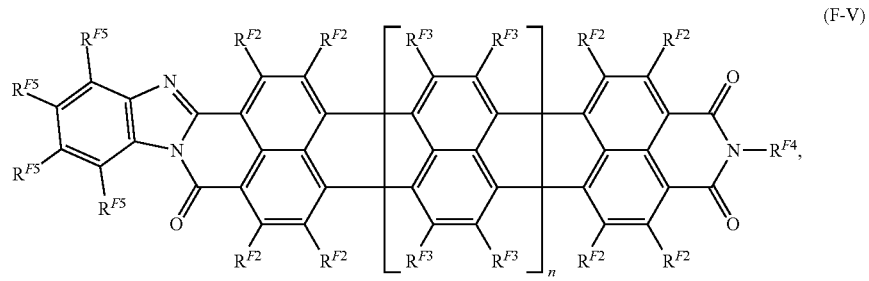

(F-V)

wherein n is 1, 2, 3, 4, 5, 6, 7 or 8;

$R^{F2}$, $R^{F3}$, $R^{F6}$ are each independently, H, F, Cl, Br, $OR^{FA}$, $OCH_2R^{FA}$, $SR^{FA}$, $SCH_2R^{FA}$, $C(=O)OR^{FA}$, an alkyl or alkoxy group having 1 to 10 C atoms, or an alkenyl or alkynyl group having 2 to 10 C atoms, or a cycloalkyl group having 3 to 10 C atoms, which are optionally substituted by one or more radicals $R^{FA}$, or an aryl or heteroaryl group having 6 to 30 aromatic ring atoms, which are optionally substituted by one or more radicals $R^{FA}$, or an aralkyl or heteroaralkyl group having 6 to 30 aromatic ring atoms, which are optionally substituted by one or more radicals $R^{FA}$, or an aryloxy or heteroaryloxy group having 6 to 30 aromatic ring atoms, which are optionally substituted by one or more radicals $R^{FA}$;

$R^{FA}$ is, each independently, F, Cl, Br, —$OCF_2R^{FB}$, —$CF_2O—R^{FB}$, an alkyl or alkoxy group having 1 to 10 C atoms, or an alkenyl or alkynyl group having 2 to 10 C atoms, or a cycloalkyl group having 3 to 10 C atoms, where the said groups are optionally substituted by one or more radicals $R^{FB}$, or an aryl or heteroaryl group having 6 to 30 aromatic ring atoms, which are optionally substituted by one or more radicals $R^{FB}$; and $R^{FB}$ is, each independently, F or an aliphatic, aromatic or heteroaromatic organic radical having 1 to 20 C atoms.

19. The liquid-crystalline medium according to claim 1, wherein the dichroic dye F has its longest-wave absorption maximum at a wavelength of greater than 600 nm and up to 655 nm.

20. The liquid-crystalline medium according to claim 1, wherein the dichroic dye F has a color blue.

21. A liquid-crystalline medium comprising at least one dichroic dye F having a rylene structure whose longest-wave absorption maximum is at a wavelength of greater than 600 nm, and which is selected from the group consisting of the following compounds

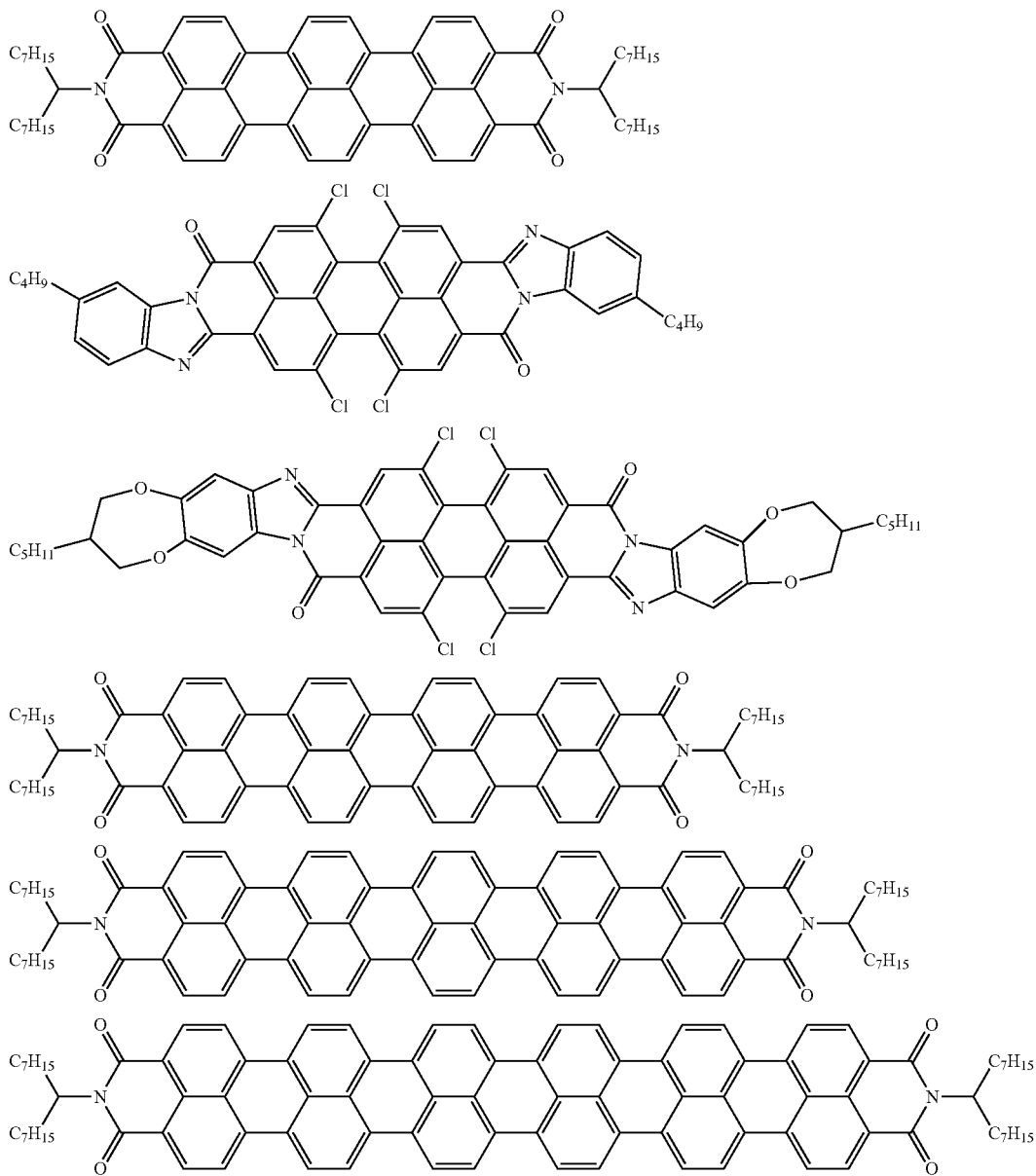

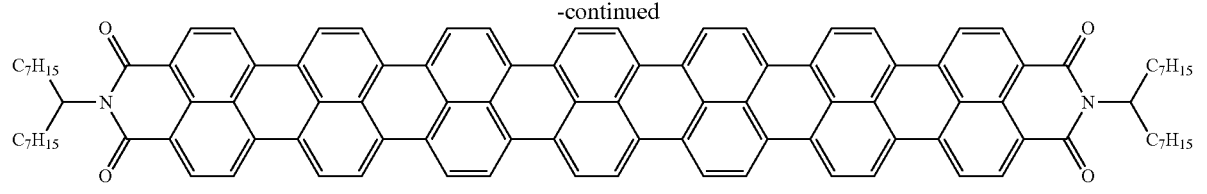

and

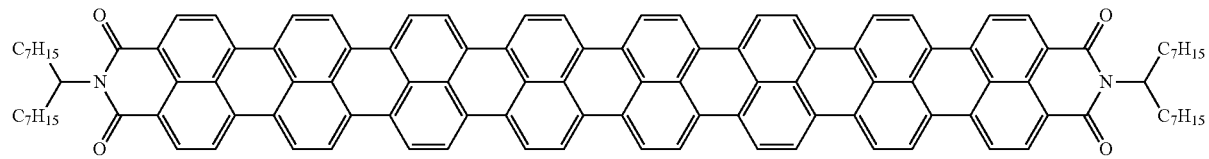

and
one or more compounds of formula (I)

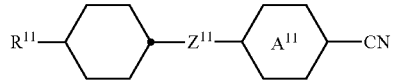

(I)

wherein
$R^{11}$ is H, F, Cl, CN, NCS, $R^1$—O—CO—, $R^1$—CO—O—, an alkyl, alkoxy or thioalkoxy group having 1 to 10 C atoms, or an alkenyl, alkenyloxy or thioalkenyloxy group having 2 to 10 C atoms, in which one or more H atoms in the above-mentioned groups are optionally replaced by F, Cl or CN, and in which one or more $CH_2$ groups in the above-mentioned groups are optionally replaced by O, S, —O—CO— or —CO—O—, $R^1$ is an alkyl group having 1 to 10 C atoms, in which one or more hydrogen atoms are optionally replaced by F or Cl, and in which one or more $CH_2$ groups are optionally replaced by O or S, $Z^{11}$ is —CO—O—, —O—CO—, —$CF_2$—$CF_2$—, —$CF_2$—O—, —O—$CF_2$—, —$CH_2$—$CH_2$—, —CH=CH—, —CF=CF—, —CF=CH—, —CH=CF—, —C≡C—, —$OCH_2$—, —$CH_2O$—or a single bond, $A^{11}$ is

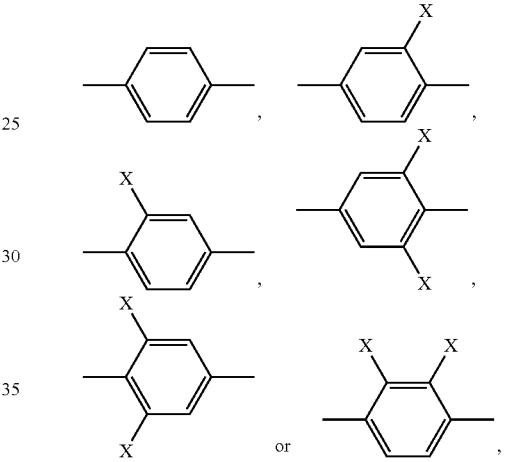

and
X is, each independently, F, Cl, CN or an alkyl, alkoxy or alkylthio group having 1 to 10 C atoms, in which one or more hydrogen atoms in the above-mentioned groups are optionally replaced by F or Cl, and in which one or more $CH_2$ groups in the above-mentioned groups are optionally replaced by O or S.

\* \* \* \* \*